(12) United States Patent
Huang et al.

(10) Patent No.: US 9,704,523 B1
(45) Date of Patent: Jul. 11, 2017

(54) SLIDER WITH TUNNEL FEATURE

(71) Applicant: HGST Netherlands B.V., Amsterdam (NL)

(72) Inventors: Weidong Huang, Palo Alto, CA (US); Akiko Tadamasa, Fujisawa (JP)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/164,822

(22) Filed: May 25, 2016

Related U.S. Application Data

(60) Provisional application No. 62/275,857, filed on Jan. 7, 2016.

(51) Int. Cl.
*G11B 5/60* (2006.01)
(52) U.S. Cl.
CPC .................................. *G11B 5/6082* (2013.01)
(58) Field of Classification Search
CPC ........................................................ G11B 5/60
USPC ............................................ 360/236.1, 236.3
See application file for complete search history.

(56) References Cited

U.S. PATENT DOCUMENTS

| | | | |
|---|---|---|---|
| 5,095,613 A | 3/1992 | Hussinger et al. | |
| 5,442,850 A | 8/1995 | Kerth | |
| 6,069,769 A * | 5/2000 | Dorius | G11B 5/6005 360/235.6 |
| 6,072,663 A * | 6/2000 | Yokohata | G11B 5/6005 360/235.8 |
| 6,106,736 A * | 8/2000 | LeVan | C23F 1/02 216/22 |
| 6,287,475 B1 | 9/2001 | Fukushima et al. | |
| 6,297,932 B1 | 10/2001 | Liu | |
| 6,437,945 B1 * | 8/2002 | Hawwa | G11B 5/54 360/254.8 |
| 6,445,542 B1 | 9/2002 | Levi et al. | |
| 6,870,707 B1 | 3/2005 | Zheng et al. | |
| 6,879,464 B2 | 4/2005 | Sun et al. | |
| 6,989,966 B2 | 1/2006 | Rajakumar | |
| 7,394,623 B2 * | 7/2008 | Song | G11B 5/6005 360/235.5 |
| 7,450,343 B2 | 11/2008 | Huang | |

(Continued)

FOREIGN PATENT DOCUMENTS

| | | | |
|---|---|---|---|
| JP | 63187478 A | * | 8/1988 |
| JP | 01211234 A | * | 8/1989 |

OTHER PUBLICATIONS

Dufresne, Manuel Anaya et al., "Ultra-Low Flying Height Air Bearing Designs," IEEE Transactions on Magnetics, vol. 36, No. 5, Sep. 2000, pp. 2733-2735.

(Continued)

*Primary Examiner* — Allen T Cao
(74) *Attorney, Agent, or Firm* — Jacobsen IP Law; Krista S. Jacobsen

(57) ABSTRACT

Disclosed herein are hard disk drive sliders having one or more tunnels between the leading-edge surface of the slider and the air-bearing surface (ABS) that may be used to control the pitch and/or fly height of the slider. A slider comprises a leading-edge surface, an ABS, and a tunnel having an entry area at the leading-edge surface and an exit area at the ABS, the tunnel for directing gas impinging on the entry area through the slider and out the exit area toward a surface of a hard disk. The tunnel may be a convergent tunnel. The tunnel may include two or more branches.

20 Claims, 13 Drawing Sheets

(56) References Cited

U.S. PATENT DOCUMENTS

| | | | |
|---|---|---|---|
| 7,481,697 B2 | 1/2009 | Kameyama | |
| 7,515,384 B2 | 4/2009 | Huang | |
| 7,735,213 B2 | 6/2010 | Yasui et al. | |
| 7,898,769 B2 | 3/2011 | Bolasna et al. | |
| 7,961,433 B2 | 6/2011 | Zheng et al. | |
| 8,089,729 B2 | 1/2012 | Huang | |
| 8,184,405 B1 | 5/2012 | Zheng et al. | |
| 8,284,516 B1* | 10/2012 | Tang | G11B 5/1278 360/125.03 |
| 8,289,653 B2 | 10/2012 | Huang | |
| 8,300,360 B2* | 10/2012 | Bandic | G11B 5/6005 360/235.4 |
| 8,420,159 B2 | 4/2013 | Ueda et al. | |
| 8,514,521 B2 | 8/2013 | Ma et al. | |
| 9,082,441 B1 | 7/2015 | Hu et al. | |
| 2006/0182373 A1* | 8/2006 | Kawai | F16C 29/025 384/15 |
| 2009/0196128 A1* | 8/2009 | Lille | G11B 5/102 369/13.32 |
| 2012/0146631 A1* | 6/2012 | Lacey | G11B 5/4555 324/210 |

OTHER PUBLICATIONS

Hu, Yong, "Contact Take-Off Characteristics of Proximity Recording Air Bearing Sliders in Magnetic Hard Disk Drives," Abstract, J. Tribol 121(4), 948-954 (Oct. 1, 1999).

Li, Jianhua, et al., "ABS Design for Anti-Surface Borne Particles," IEEE Transactions on Magnetics, vol. 37, vol. 4, Jul. 2001, pp. 1802-1805.

Zheng, Jinglin et al., "Effects of Altitude on Thermal Flying-Height Control Actuation," Tribol Lett (Jul. 2010) 40:295-99.

* cited by examiner

SLIDER WITH TUNNEL FEATURE

CROSS-REFERENCE TO RELATED APPLICATIONS

This application claims the benefit of, and hereby incorporates by reference the contents of, U.S. provisional patent application No. 62/275,857, filed Jan. 7, 2016, entitled "SLIDERS WITH EXTENDED THREE-DIMENSIONAL AIR-BEARING SURFACES, AND METHODS FOR FABRICATING SUCH SLIDERS", having inventors Weidong Huang and Akiko Tadamasa.

This application is being filed on the same day as, and hereby incorporates by reference the contents of, the related U.S. application Ser. No. 15/164,811, entitled "SLIDER WITH EXTENDED THREE-DIMENSIONAL AIR-BEARING SURFACE", having inventor Weidong Huang, and Ser. No. 15/164,817, entitled "FABRICATION PROCESS FOR SLIDER WITH EXTENDED THREE-DIMENSIONAL AIR-BEARING SURFACE", having inventor Weidong Huang.

BACKGROUND

Magnetic storage systems, such as hard disk drives, are used to store large amounts of information. A magnetic head in a magnetic storage system typically includes a read/write transducer for retrieving and storing magnetically encoded information on a magnetic recording medium, such as a disk. A suspended slider supports the magnetic head. The slider provides mechanical support for the magnetic head and the electrical connections between the magnetic head and the rest of the magnetic storage system.

During operation, the slider floats a small distance above the magnetic recording medium (i.e., the hard disk), which rotates at high speeds. Components of a disk drive move the slider and, therefore, the magnetic head to a desired radial position over the surface of the rotating disk, and the magnetic head reads or writes information. The slider rides on a cushion or bearing of air created above the surface of the disk as the disk rotates at its operating speed. The slider has an air-bearing surface (ABS) that faces the disk. The ABS is designed to generate an air-bearing force that counteracts a preload bias that pushes the slider toward the disk. The ABS causes the slider to fly above and out of contact with the disk.

Conventional slider fabrication techniques place limitations on the design of the slider ABS. There is, however, an ongoing need for slider designs that improve performance of magnetic storage systems.

SUMMARY

Disclosed herein are novel slider designs that improve the performance of magnetic storage systems and magnetic heads and hard disk drives incorporating such novel sliders. In some embodiments, a slider comprises a leading-edge surface, an air-bearing surface (ABS), and a tunnel having an entry area at the leading-edge surface and an exit area at the ABS, the tunnel for directing gas impinging on the leading-edge surface through the slider and out the exit area toward a surface of a hard disk. In some embodiments, the entry area is larger than the exit area. In some embodiments, the tunnel is a convergent tunnel. In some embodiments, a perimeter of the tunnel at an interior position within the tunnel is larger than a perimeter of the exit area.

The surfaces of the tunnel may be smooth, or they may include at least one protrusion or cavity. In some embodiments, at least one surface of the tunnel is smooth. In other embodiments, at least one surface of the tunnel includes a protrusion. In some embodiments in which at least one surface of the tunnel includes a protrusion, the protrusion comprises a rail, a bump, or a dome. In some embodiments, at least one surface of the tunnel includes a cavity, which may have a uniform or nonuniform shape. In some embodiments in which at least one surface of the tunnel includes a cavity, the cavity has a uniform shape.

The slider may include more than one tunnel. In some embodiments, the tunnel is a first tunnel, the entry area is a first entry area, and the exit area is a first exit area, and the slider further comprises a second tunnel having a second entry area at the leading-edge surface and a second exit area at the ABS, the second tunnel for directing gas impinging on the second entry area through the slider and out the second exit area toward the surface of the hard disk.

The tunnel may include more than one entry area and/or more than one exit area. In some embodiments, the entry area is a first entry area, and the slider further comprises a second entry area, and the tunnel includes a first branch connecting the first entry area to the exit area and a second branch connecting the second entry area to the exit area. In some embodiments, the exit area is a first exit area, and the slider further comprises a second exit area, and the tunnel includes a first branch connecting the entry area to the first exit area and a second branch connecting the entry area to the second exit area.

In some embodiments, the slider has a back surface opposite the ABS, at least a portion of the back surface defining a plane, and an ABS function of a cross-section of the slider taken perpendicular to the plane is a multi-valued function. The cross-section may intersect the tunnel. In some embodiments, at least a portion of the leading-edge surface is substantially perpendicular to the plane, and the cross-section is substantially perpendicular or substantially parallel to the at least a portion of the leading-edge surface. In some embodiments, the cross-section is oriented along an axis in the plane, and the multi-valued function has at least three distinct values for at least one input value along the axis. In some embodiments, the cross-section is oriented along an axis in the plane, and the multi-valued function has exactly three distinct values for at least one input value along the axis.

In some embodiments, the slider further comprises a head for reading from and writing to a disk.

BRIEF DESCRIPTION OF THE DRAWINGS

The disclosure herein is illustrated by way of example, and not by way of limitation, in the figures of the accompanying drawings, in which like reference numerals refer to similar elements and in which.

DETAILED DESCRIPTION

The following description is made for the purpose of illustrating the general principles of the present disclosure and is not meant to limit the inventive concepts claimed herein. Furthermore, particular embodiments described herein may be used in combination with other described embodiments in various possible combinations and permutations.

Figure 1:
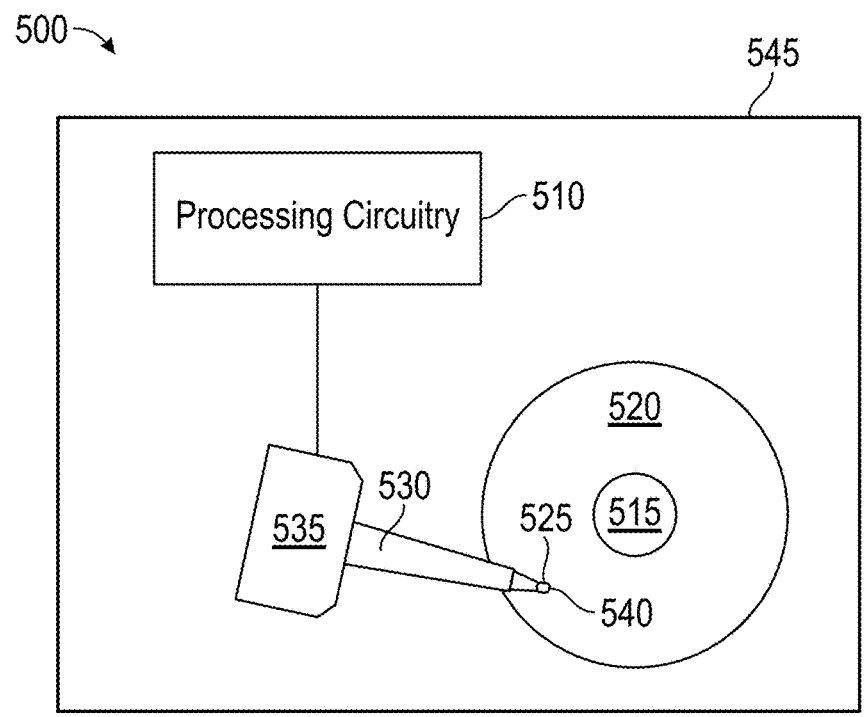
FIG. 1 illustrates several components of an exemplary hard disk drive in accordance with some embodiments.

FIG. 1 illustrates several components of an exemplary hard disk drive 500 in accordance with some embodiments. The magnetic hard disk drive 500 includes a spindle 515 that supports and rotates a magnetic disk 520. The spindle 515 is rotated by a spindle motor (not shown) that is controlled by a motor controller (not shown) that may be implemented in electronics of the hard disk drive 500. A slider 525, which is supported by a suspension and actuator arm 530, has a combined read and write magnetic head 540. The head 540 may include only one read sensor, or it may include multiple read sensors. The read sensors in the head 540 may include, for example, one or more giant magnetoresistance (GMR) sensors, tunneling magnetoresistance (TMR) sensors, or another type of magnetoresistive sensor. An actuator 535 rotatably positions the suspension and actuator arm 530 over the magnetic disk 520. The components of the hard disk drive 500 may be mounted on a housing 545. It is to be understood that although FIG. 1 illustrates a single disk 520, a single slider 525, a single head 540, and a single suspension and actuator arm 530, hard disk drive 500 may include a plurality (i.e., more than one) of disks 520, sliders 525, heads 540, and suspension and actuator arms 530.

In operation, the actuator 535 moves the suspension and actuator arm 530 to position the slider 525 so that the magnetic head 540 is in a transducing relationship with the surface of the magnetic disk 520. When the spindle motor rotates the disk 520, the slider 525 is supported on a thin cushion of air known as the air bearing that exists between the surface of the disk 520 and an air-bearing surface of the slider 525. The head 540 may be used to write information to multiple tracks on the surface of the disk 520 and to read previously-recorded information from the tracks on the surface of the disk 520. Processing circuitry 510 provides to the head 540 signals representing information to be written to the disk 520 and receives from the head 540 signals representing information read from the disk 520. The processing circuitry 510 also provides signals to the spindle motor to rotate the magnetic disk 520, and to the actuator 535 to move the slider 525 to various tracks.

To read information from the magnetic disk 520, the slider 525 passes over a region of the disk 520, and the head 540 detects changes in resistance due to magnetic field variations recorded on the disk 520, which represent the recorded bits.

The slider 525 has a gas-bearing surface that faces the surface of the disk 520 and counteracts a preload bias that pushes the slider toward the disk 520. For convenience, in this document the gas-bearing surface is referred to as the air-bearing surface (ABS) and the gas is generally referred to as "air," although it is to be understood that the gas used in a hard disk drive 500 may be a gas other than air (e.g., the gas may be helium). For simplicity, throughout this disclosure, the surface of the slider 525 that faces or that will eventually face the disk 520 is referred to as the ABS.

As the disk 520 rotates, the disk 520 drags air under the slider 525 and along the ABS in a direction approximately parallel to the tangential velocity of the disk 520. As the air passes under the ABS, air compression along the air flow path causes the air pressure between the disk 520 and the ABS to increase, which creates a hydrodynamic lifting force that counteracts the tendency of the suspension and actuator arm 530 to push the slider 525 toward the disk 520. The slider 525 thus flies above the disk 520 but in close proximity to the surface of the disk 520. To obtain good performance, it is desirable for the slider 525 to maintain a substantially constant flying height above the surface of the disk 520. The degree of stability of the fly-height of the slider influences the performance of the magnetic head 540. The design of the slider 525 ABS has an impact on the flying characteristics of the slider 525 and therefore the performance of the magnetic head 540.

A conventional slider 525 ABS may include a pair of raised side rails that face the disk 520 surface. The raised side rails may be separated by an etched cavity and have tapered or stepped leading edges. Additional stepped surfaces may also be formed at various other locations on the slider 525 ABS.

Conventionally, the slider 525 is fabricated from a wafer using a photolithography process having two steps: (a) covering a portion of a surface of the wafer, and (b) removing substrate material from the exposed (i.e., not covered) surface of the wafer. Step (a) may be accomplished, for example, using a binary mask having hard edges to create a well-defined pattern in a photoresist layer that is applied to the wafer surface. Step (b) may be accomplished, for example, by lapping, etching, or milling (e.g., using an ion beam) to transfer the photoresist pattern to the wafer surface. The surface of the slider 525 to which the covering is applied and from which material is removed is the surface that will eventually face the disk 520 when the slider 525 is used in a disk drive 500, i.e., the ABS. The steps (a) and (b) may be repeated multiple times to create different slider features.

Figure 2A:
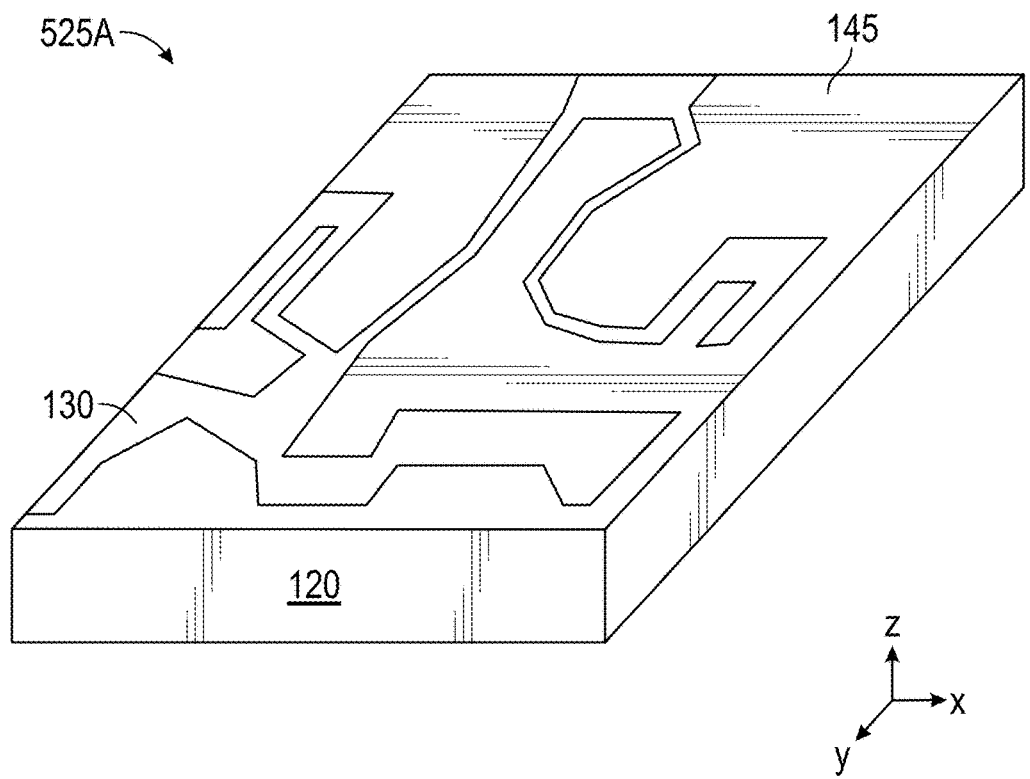
FIG. 2A illustrates an exemplary slider having a mask applied in a prior-art fabrication process.
Figure 2B:
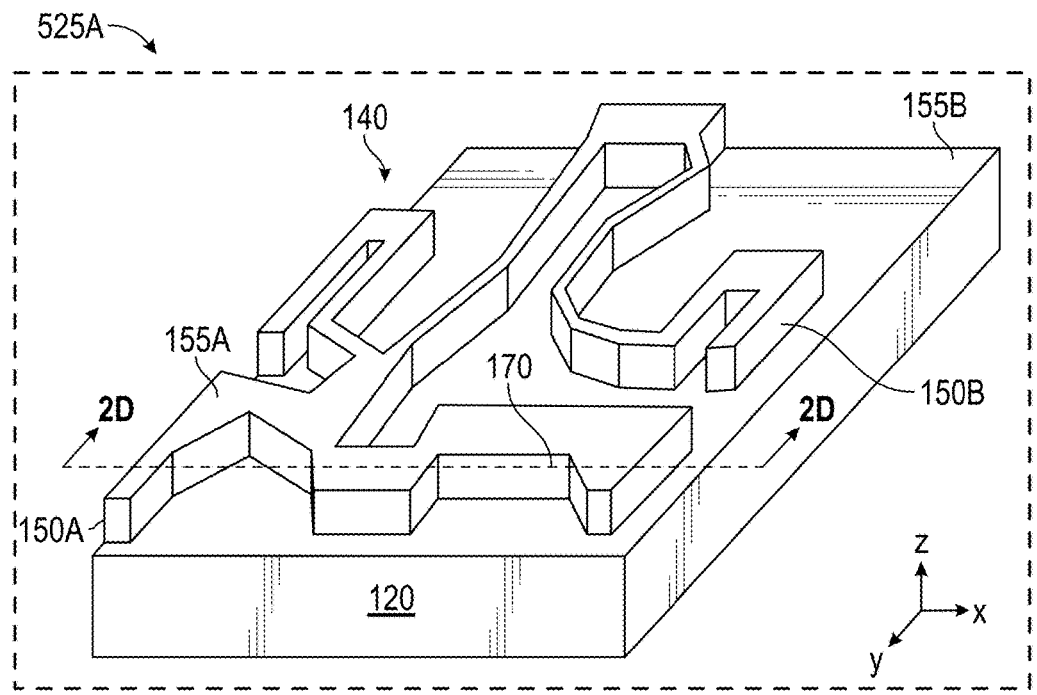
FIG. 2B illustrates the exemplary slider of FIG. 2A after the removal of portions not protected by the mask.
Figure 2C:
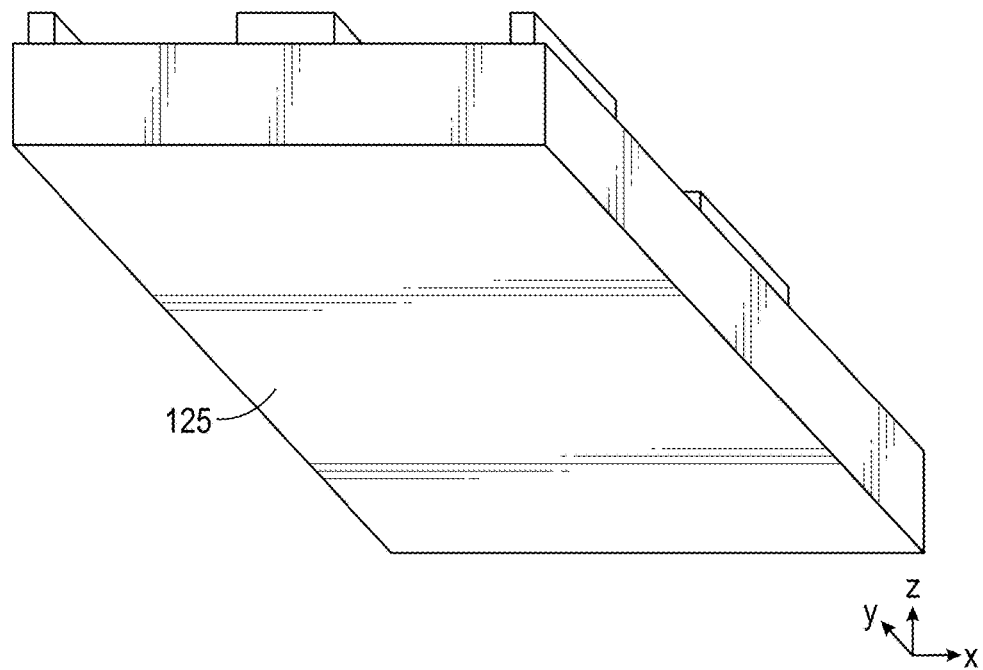
FIG. 2C illustrates the back surface of the exemplary slider of FIG. 2B.

FIGS. 2A through 2C illustrate an exemplary slider 525A being fabricated using a prior-art fabrication process having two steps as described above. FIGS. 2A, 2B, and 2C show a three-dimensional wafer 120 oriented according to the three-dimensional axes shown in FIGS. 2A through 2C, which use rectangular coordinates in directions labeled as x, y, and z. It is to be understood that the labeling of the three axes as x, y, and z is arbitrary. Furthermore, it is to be understood that the use of a rectangular coordinate system is convenient because the wafer 120 initially has a cuboid shape, but other coordinate systems (e.g., polar, cylindrical, spherical) could be used instead, but might not be as convenient if the wafer 120 has a cuboid shape. Moreover, the x-, y-, and z-axes are oriented parallel and perpendicular to the surfaces of the wafer 120 shown in FIG. 2A for convenience and to simplify the explanations herein.

As illustrated in FIG. 2A, before fabrication begins, the wafer 120 has a substantially flat initial surface 145 that lies in an x-y plane. The initial surface 145 is the surface of the wafer 120 from which material is removed to form an ABS having features such as those described previously (e.g., side rails, edges, stepped surfaces, etc.). The wafer 120 also has a substantially flat back surface 125, shown in FIG. 2C, which also lies in an x-y plane. Because material is not removed from the back surface 125 during fabrication, the back surface 125 remains substantially flat in the finished slider 525A.

To create an exemplary slider 525A from the wafer 120, a mask 130, shown in FIG. 2A, is applied to the initial surface 145 to protect the regions of the initial surface 145 under the mask 130. Material is then removed from the portion of the wafer 120 that is not protected by the mask 130. There are many ways to accomplish the removal, such as, for example, by etching the initial surface 145 from a direction perpendicular to the initial surface 145 (i.e., from above the initial surface 145 as illustrated in FIG. 2A) or by using an ion mill with ions aimed at the initial surface 145 in the z-direction. As a result of the removal of material from the wafer 120, only the portion of the initial surface 145 protected by the mask 130 remains intact.

FIG. 2B shows the slider 525A after regions of the wafer 120 not protected by the mask 130 have been removed from the z-direction (e.g., by directing an ion beam at the initial surface 145 from above the wafer 120). As shown in FIG. 2B, the portion of the wafer 120 that was under the mask 130 remains intact, whereas material from the wafer 120 that was not under the mask 130 has been removed. Assuming for the sake of example that the slider 525A is now complete, the ABS 140 is the three-dimensional surface that includes the portion of the initial surface 145 previously protected by the mask 130 (i.e., the portion of the initial surface 145 that remains after removal of material from the wafer 120) and the newly-created surface in the wafer 120, which is recessed from the plane that contained the initial surface 145. Thus, the ABS 140 of FIG. 2B has two levels, 155A and 155B.

As shown in FIG. 2B, the slider 525A has transitions in the z-direction between the levels 155A (i.e., regions of the wafer 120 formerly covered by the mask 130) and 155B (i.e., the now-exposed regions of the wafer 120 from which material was removed). For example, FIG. 2B labels two z-direction transitions 150A and 150B, although there are, of course, many other z-direction transitions shown.

Figure 2D:
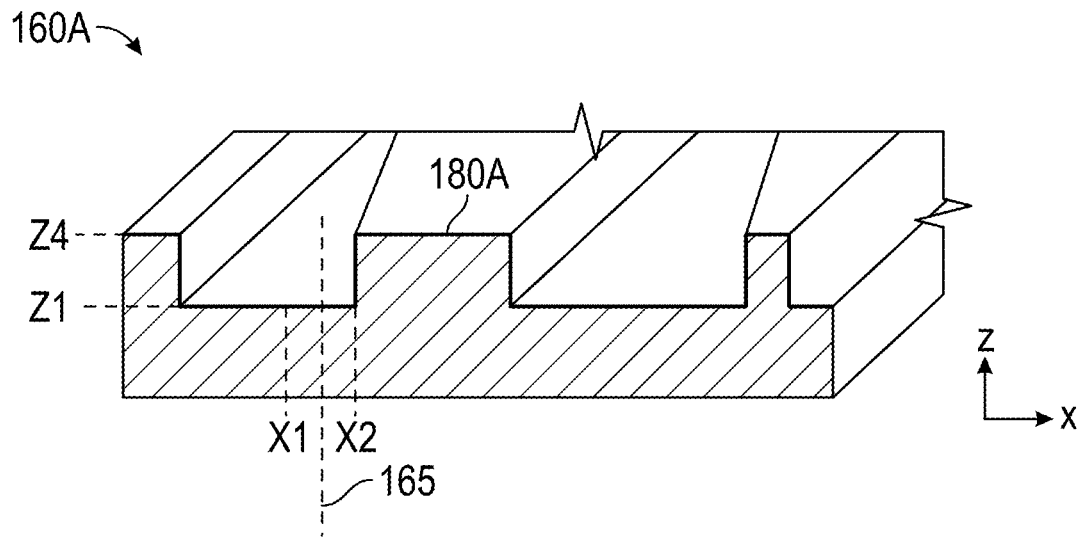
FIG. 2D illustrates a cross-section of the exemplary slider illustrated in FIGS. 2B and 2C.

FIG. 2D shows a cross-section 160A of the exemplary slider 525A illustrated in FIGS. 2B and 2C. The cross-section 160A is taken parallel to the z-axis and perpendicular to the back surface 125 (i.e., the cross-section is made vertically, perpendicular to the x-y plane based on the orientation of the axes in FIG. 2B) along the dashed line 170 shown on the level 155A of the slider 525A illustrated in FIG. 2B. For ease of explanation, as shown in FIG. 2D, the cross-section 160A has been taken in an x-z plane defined by the axes illustrated in FIGS. 2A and 2B. Therefore, the cross-section 160A illustrates how the ABS 140 varies along the z-axis as a function of the value along the x-axis at whatever fixed value of y is represented by the line 170 in FIG. 2B.

As used herein, the term "single-valued function" means a relation f(x) for which, for all possible values of x, f(x) has exactly one value or a discontinuity.

As used herein, the term "multi-valued function" means a relation f(x) for which, for at least one possible value of x, f(x) has two or more distinct nonzero values. For purposes of the definition of multi-valued function herein, a discontinuity does not have two or more distinct nonzero values.

The terms "single-valued function" and "multi-valued function" as used herein are mutually exclusive. A single-valued function cannot be a multi-valued function, and a multi-valued function cannot be a single-valued function, even if, in some range of x values, the multi-valued function has all of the properties of a single-valued function. In other words, as used herein, a function can be either a single-valued function or a multi-valued function, but not both.

As will be appreciated by a person having ordinary skill in the art, as used herein, the terms "function," "single-valued function," and "multi-valued function" do not necessarily comport with those terms as they may be used in mathematics. For example, in mathematics the terms "function" and "single-valued function" typically mean a relation in which for each input there is exactly one output. Here, a single-valued function may also include a discontinuity, meaning that for a selected value of x at which a discontinuity occurs, the single-valued function f(x) evaluates to many values in a range defined by the discontinuity.

The term "ABS function" is used herein to describe the characteristics of a portion of the ABS 140 in a two-dimensional plane made by taking a cross-section of the slider 525 parallel to the z-axis and perpendicular to the x-y plane (i.e., the plane defined by the back surface 125, assuming the back surface 125 is substantially flat). Using the orientation of axes presented herein, i.e., with the initial surface 145 and back surface 125 lying in parallel x-y planes, the ABS function describes how the ABS 140 varies in the z-direction along a selected axis in an x-y plane. The ABS function does not include any portion of the back surface 125.

Using the definitions provided above, an ABS function in which, for all possible input values along the selected axis in the x-y plane, the ABS function has exactly one value or a discontinuity is a single-valued function. In other words, the ABS function is a single-valued function if, for all possible input values along the selected axis in the x-y plane, the ABS function has exactly one value or a discontinuity. In contrast, an ABS function having at least one input value along the selected axis in the x-y plane for which the ABS function has two or more distinct nonzero z-values is a multi-valued function. Thus, the ABS function is a multi-valued function if, for at least one input value along the selected axis in the x-y plane, the ABS function has two or more distinct nonzero z-values. It is to be appreciated that an ABS function need not be continuous, as some of the exemplary new slider embodiments herein will illustrate.

FIG. 2D shows the ABS function 180A resulting from the exemplary cross-section 160A. For clarity, the ABS function 180A is shown in bold. As is evident from FIG. 2D, the ABS function 180A is a piecewise linear function. As explained previously, for ease of explanation, the cross-section 160A is taken parallel to the x-axis at a selected value of y, and therefore the axis in the x-y plane is simply an x-axis. As shown by the vertical dashed line 165 in FIG. 2D, which may be positioned anywhere along the x-axis, for any selected value of x along the cross-section 160A, the ABS function 180A has either exactly one z-value, or there is a vertical transition, i.e., a discontinuity, at that value of x. For example, as shown in FIG. 2D, when the value of x is X1, the ABS function 180A has exactly one nonzero z-value, Z1. When the value of x is X2, the ABS function 180A has a discontinuity and evaluates to all values between Z1 and Z4. Therefore, the ABS function 180A is a single-valued function.

Although FIG. 2D shows only one exemplary cross-section of the slider 525A illustrated in FIG. 2B, as will be understood by those having ordinary skill in the art after reading and understanding the disclosures herein, the ABS function 180 resulting from any cross-section 160 of the slider 525A illustrated in FIG. 2B made parallel to the z-axis and perpendicular to an x-y plane will be a single-valued function. This ABS function 180 will be a single-valued function regardless of the orientation of the cross-section 160 with respect to the x- and y-axes (i.e., regardless of which axis in the x-y plane is selected); as long as the cross-section 160 is made parallel to the z-axis (i.e., perpendicular to the x-y plane), the resulting ABS function 180 will be a single-valued function.

It is to be appreciated that the value of y that coincides with the line 170 in FIG. 2B is arbitrary. The line 170 could be moved to another value of y along the y-axis, and the resulting cross-section 160 would have similar characteristics to the cross-section 160A shown in FIG. 2D. Specifically, the resulting cross-section 160 would have an ABS function 180 that is a single-valued function. Furthermore, the line 170 could be oriented parallel to the y-axis instead of parallel to the x-axis, thereby defining a cross-section 160 in the y-z plane instead of in the x-z plane as shown in FIG. 2C. In this case, too, the resulting cross-section 160 would have similar characteristics to the cross-section 160A shown in FIG. 2D; in other words, that cross-section 160 would also have an ABS function 180 that is a single-valued function. It is also to be appreciated that, as shown in FIG. 2B, the line 170 is parallel to the y-axis, and therefore represents a single value of y, only for ease of explanation and presentation. A cross-section 160 taken parallel to the z-axis and perpendicular to any arbitrary axis in the x-y plane would have similar characteristics to the cross-section 160A shown in FIG. 2D (i.e., would have an ABS function 180 that is a single-valued function) but could be more complicated to describe using the axes shown in FIGS. 2A through 2C because both the value of x and the value of y could vary along the cross-section 160.

As explained above, FIG. 2B illustrates an exemplary slider 525A created using only one mask 130, but additional masks may be applied to the slider 525A shown in FIG. 2B to create additional features or contours. For example, a different mask may be applied to the slider 525A of FIG. 2B to cover not only the region formerly covered by the mask 130, but also additional exposed areas of the wafer 120, and additional material may subsequently be removed from the wafer 120. Alternatively, a mask that does not entirely cover the region covered by the mask 130 may be applied, and material from the portion of the wafer 120 formerly protected by the mask 130 may then be removed along with material from elsewhere on the wafer 120. After the removal of material unprotected by each mask, yet another mask may be applied and yet more material removed, and so on.

Figure 2E:
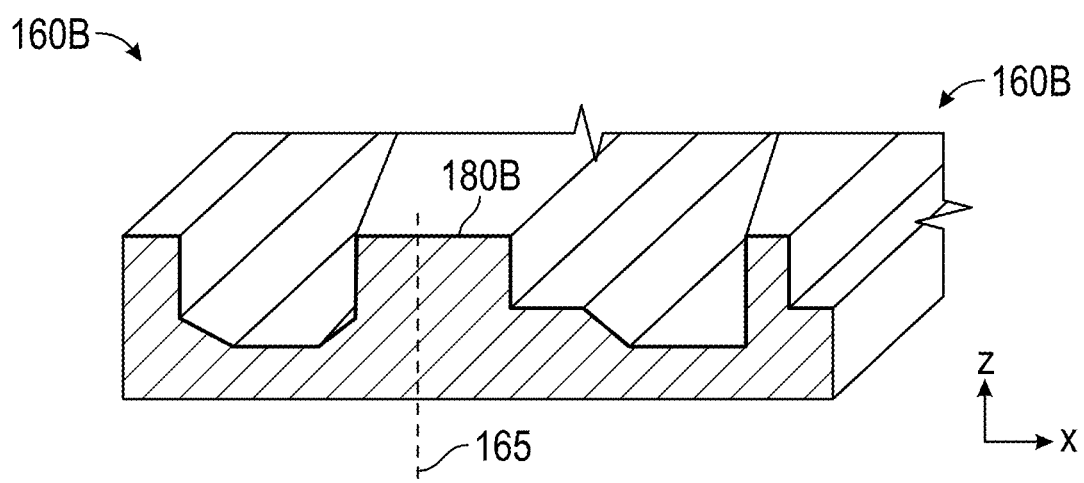
FIG. 2E illustrates a cross-section of an exemplary slider created by removing additional material from the slider shown in FIGS. 2B and 2C.

FIG. 2E illustrates a cross-section 160B of an exemplary slider (not shown) created by removing additional material from the wafer 120 shown in FIG. 2B. Like the cross-section 160A of FIG. 2D, the cross-section 160B is taken in the z-direction, parallel to the z-axis and perpendicular to an x-y plane (e.g., the x-y plane that coincides with the back surface 125) along a selected axis in the x-y plane. For ease of explanation, the cross-section 160B has been taken parallel to the x-axis (and perpendicular to the y-axis) and therefore, like the cross-section 160A of FIG. 2D, lies in an x-z plane defined by the axes illustrated in FIGS. 2A through 2C. Therefore, the cross-section 160B illustrates how the ABS function 180B varies (in the direction of the z-axis) as a function of the value along the x-axis at a selected value of y. Again, for clarity, the ABS function 180B is shown in bold. As shown by FIG. 2E, although the ABS function 180B has more contours and transitions than the ABS function 180A, the ABS function 180B is still a single-valued function because for any selected value of x at which the line 165 may be located, the ABS function 180B has exactly one nonzero value or a discontinuity.

Figure 3A:
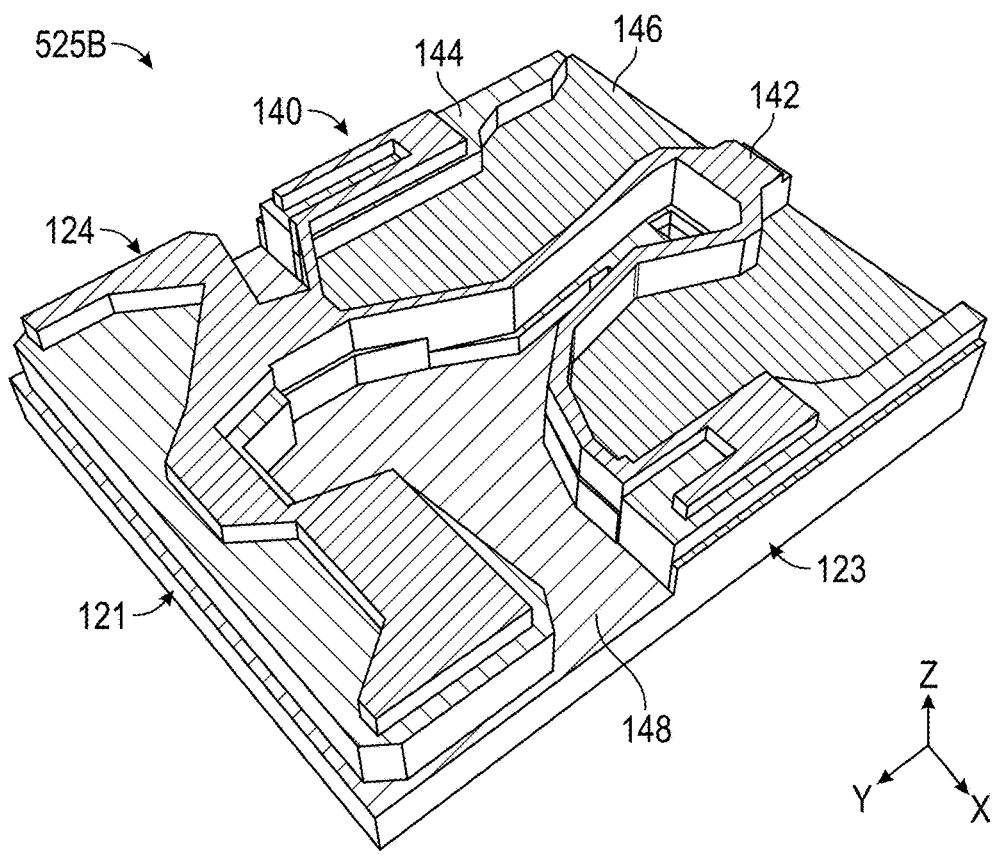
FIGS. 3A through 3C illustrate different views of an exemplary slider having an air-bearing surface with four levels.
Figure 3B:
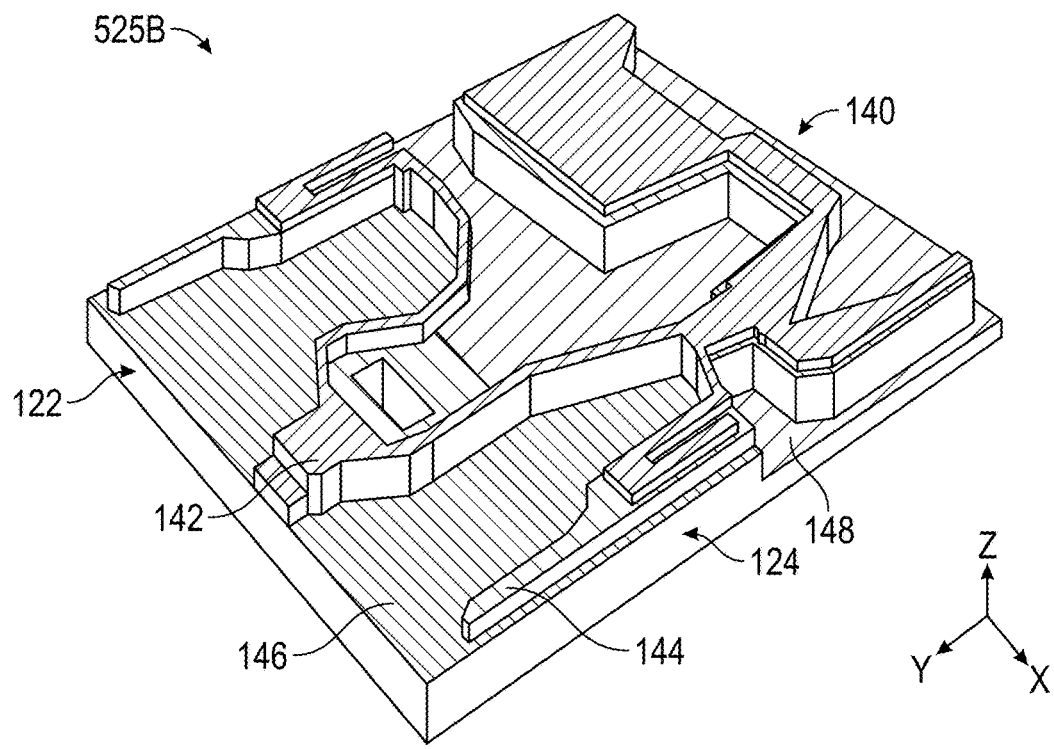
Figure 3C:
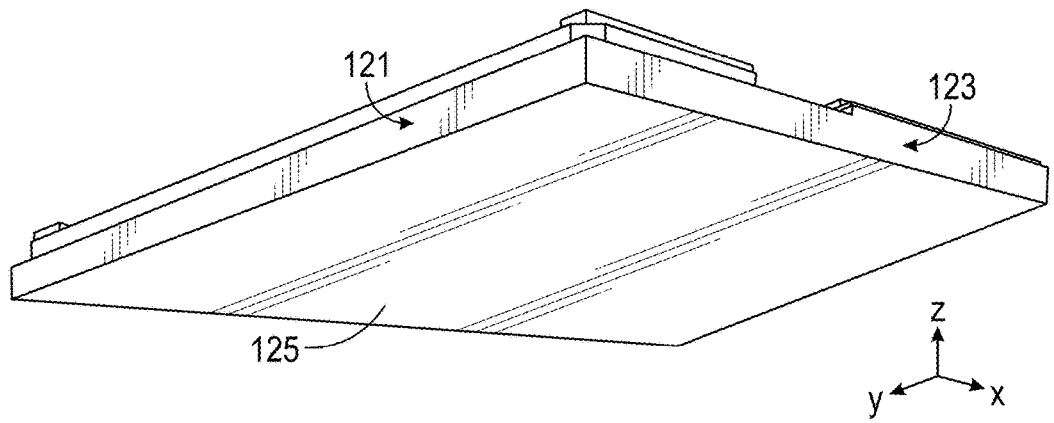

FIGS. 3A through 3C illustrate a more complicated exemplary slider 525B created by a prior-art process in which the steps of applying a mask and removing material from unprotected regions of the wafer 120 have been executed three times to create an ABS 140 having four levels. The slider 525B has six surfaces: the back surface 125 (shown in FIG. 3C), a leading-edge surface 121 (shown in FIGS. 3A and 3C), a trailing-edge surface 122 (shown in FIG. 3B), an inner-radius surface 123 (shown in FIGS. 3A and 3C), an outer-radius surface 124 (shown in FIG. 3B), and an ABS 140 (shown in FIGS. 3A and 3B). In the exemplary slider 525B shown in FIGS. 3A through 3C, the leading-edge surface 121, trailing edge surface 122, inner-radius surface 123, and outer-radius surface 124 are substantially perpendicular to the back surface 125. The leading-edge surface 121 and trailing-edge surface 122 are substantially parallel to each other, and the inner-radius surface 123 and outer-radius surface 124 are substantially parallel to each other. The leading-edge surface 121 and trailing-edge surface 122 are both substantially perpendicular to both of the inner-radius surface 123 and the outer-radius surface 124. In some embodiments, the leading-edge surface 121, trailing-edge surface 122, inner-radius surface 123, and outer-radius surface 124 may be substantially perpendicular to at least a portion of the ABS 140.

A first level 142 of the ABS 140 is the level of the ABS 140 that will be closest to the disk 520 when the slider 525B is incorporated into a disk drive 500. A second level 144 is the level that will be the next-closest to the disk 520. A fourth level 148 is the level that will be furthest from the disk 520, and a third level 146 is the level that will be next-furthest from the disk 520.

The slider 525B shown in FIGS. 3A through 3C may be fabricated as follows. First, a mask having the shape of the first level 142 is applied to a cuboid wafer 120, as previously described in the discussion of FIGS. 2A through 2C. Material down to the surface of the second level 144 is then removed from the wafer 120, creating a two-level ABS 140. Next, a mask having the shape that is the union of the shape of the first level 142 and the second level 144 is applied to the ABS 140, and material not protected by the mask is removed from the wafer 120, creating a three-level ABS 140 that includes the third level 146. Finally, a mask having the shape that is the union of the shapes of the first level 142, the second level 144, and the third level 146 is applied to the ABS 140, and material not protected by the mask is removed from the wafer 120 to create the fourth level 148, as shown in FIGS. 3A and 3B.

Although the process of protecting a portion of the wafer 120 and removing material from the unprotected portion of the wafer 120 may be repeated multiple times with masks having different sizes and shapes to create a relatively complex ABS 140, such as the exemplary ABS 140 shown in FIGS. 3A through 3C, prior-art fabrication methods only allow for the removal or preservation of wafer 120 material. As a result, when a slider 525 is fabricated using prior-art techniques, in which material is removed from a particular direction, along a particular axis (assumed herein to be the z-axis using the orientation of axes shown in FIGS. 2A through 2C) perpendicular to the plane in which the back surface 125 lies (assumed herein to be the x-y plane), the ABS function 180 for any cross-section 160 taken perpendicular to the plane of the back surface 125 is a single-valued function. One can verify by inspection of FIGS. 3A through 3C that even more sophisticated sliders having multiple levels and more complex shapes have ABS functions 180 that are single-valued functions. Any cross-section 160 of the exemplary slider 525B illustrated in FIGS. 3A through 3C taken perpendicular to the x-y plane of the back surface 125 will result in an ABS function 180 that is a single-valued function.

Because prior-art slider fabrication processes only allow the removal of material from one direction, previously-existing slider fabrication methods impose significant limitations on the design of sliders 525. As a consequence, existing slider designs can have several drawbacks, including a tendency to collect lubricant, which affects the aerodynamics of a slider 525. Lubricant pickup occurs when lubricant coated on the surface of the disk 520 collects on the ABS 140. Once collected on the ABS 140, the lubricant tends to interfere with the fly-height of the slider 525, causing the slider 525 to have a tendency to fly at an inconsistent height, which results in degraded magnetic interfacing between the slider 525 and the disk 520.

Another problem with existing slider designs is that, because existing slider designs are constrained by prior-art fabrication processes, they impose limits on the types of features sliders 525 may have. There are many features that simply cannot be created economically—or, in some cases, at all—using prior-art fabrication techniques. These limitations affect designers' ability to create sliders 525 having more optimal aerodynamic and other properties.

Disclosed herein are slider 525 designs with novel ABS 140 features that provide numerous advantages, such as, for example, low vibration during self-servo write and operation, low spacing sensitivity to intermolecular force, balanced head transfer between the reader and writer, fast takeoff from thermal fly-height control (TFC) touchdown, increased robustness to particle and lubrication interference, and low spacing sensitivity to flatness change. Unlike prior-art sliders, these new sliders 525 have at least one ABS function 180 that is a multi-valued function. In other words, there is at least one cross-section 160 taken perpendicular to the plane in which the substantially flat back surface 125 of the slider 525 lies (i.e., the x-y plane with the axes oriented as described for FIGS. 2A through 2C; in other words, the cross-section 160 is taken parallel to the z-axis shown in FIGS. 2A through 2C) for which the ABS function 180 is a multi-valued function.

Also disclosed herein are processes to fabricate sliders 525 having extended three-dimensional (E3D) air-bearing surfaces, which surfaces may include, for example, the exemplary slider features described herein. The processes enables the fabrication of an E3D ABS design by combining, in some embodiments, lapping, additive manufacturing (i.e., the addition of material to the wafer 120 instead of simply the preservation or removal of wafer 120 material), and ion mill etching. These processes enable the fabrication of slider features that were previously impossible, impractical, too expensive, or too time-consuming to create.

Figure 4A:
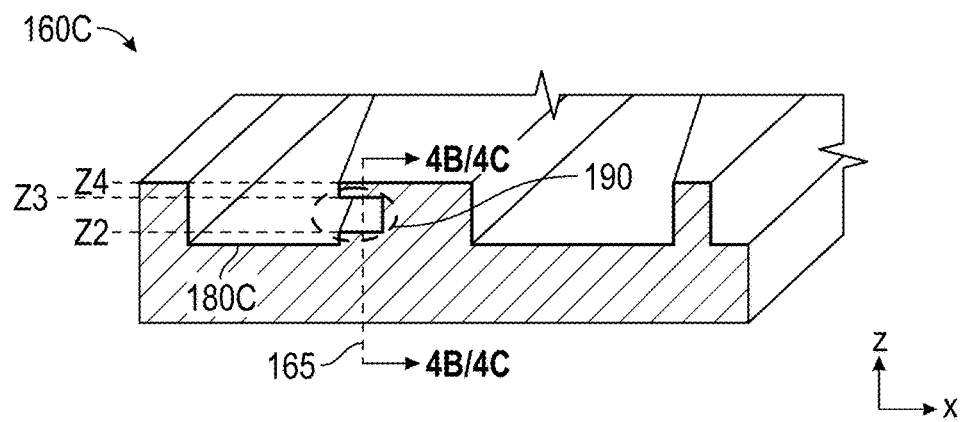
FIG. 4A illustrates a cross-section of an exemplary slider in accordance with some embodiments.

FIG. 4A illustrates an ABS function 180C of a slider cross-section 160C in accordance with some embodiments assuming axes oriented as shown in FIGS. 2A-2C and 3A-3C. For clarity, the ABS function 180C is shown in bold. For convenience, the cross-section 160C has been taken parallel to the x-axis at a particular value along the y-axis and therefore lies in an x-z plane. Thus, the cross-section 160C illustrates how the ABS function 180C varies in the direction of the z-axis as a function of the value along the x-axis at a selected value of y. In embodiments in which the leading-edge surface 121 and the trailing-edge surface 122 are substantially parallel, the cross-section 160C is likewise substantially parallel to the leading-edge surface 121 and the trailing-edge surface 122. Likewise, in embodiments in which the inner-radius surface 123 and the outer-radius surface 124 are substantially parallel to each other and substantially perpendicular to the leading-edge surface 121 and the trailing-edge surface 122, the cross-section 160C is substantially perpendicular to the inner-radius surface 123 and the outer-radius surface 124.

Figure 4B:
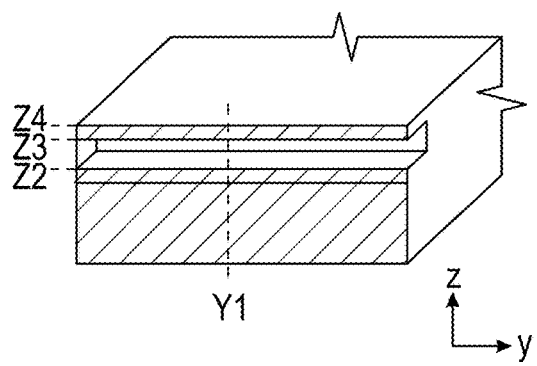
FIG. 4B illustrates a feature of a slider.
Figure 4C:
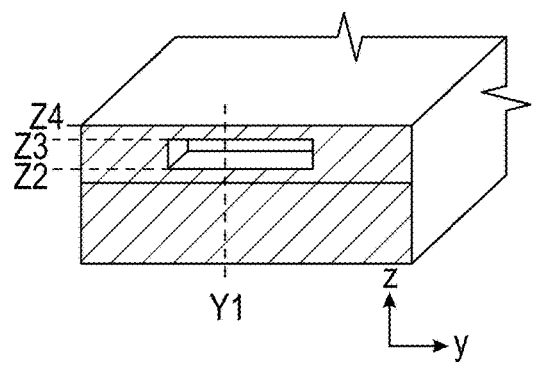
FIG. 4C illustrates a feature of a slider.

The cross-section 160C intersects a feature 190. The feature 190 may be, for example, a rectangular channel or tunnel that extends for some distance in the y-direction of the slider 525, as illustrated in FIG. 4B. FIG. 4B shows an exemplary embodiment of the feature 190 from the y-z plane assuming that the selected value of y at which the cross-section 160C of FIG. 4A was taken is Y1, shown in FIG. 4B. Alternatively, as another example, the feature 190 may be a recessed area of the slider 525 that extends for some distance along the y-direction of the slider 525. FIG. 4C illustrates an exemplary recessed area viewed in the y-z plane. FIG. 4C also shows the value Y1 at which the cross-section 160C of FIG. 4A was assumed to have been taken. It is to be understood that although FIG. 4C illustrates a rectangular opening for the recessed area, the opening may have any arbitrary shape that corresponds to the feature 190 of the ABS function 180C shown in FIG. 4A. It is to be appreciated that there are myriad slider characteristics in a y-z plane (e.g., uniform or non-uniform characteristics) that would result in the exemplary feature 190 of FIG. 4A in an x-z plane, and the examples shown in FIGS. 4B and 4C are not intended to be limiting.

Referring again to FIG. 4A, the exemplary ABS function 180C is a multi-valued function because there is at least one value of x for which the ABS function 180C has at least two distinct nonzero values. Specifically, the ABS function 180C has at least two distinct nonzero values at the locations along the x-axis intersecting the feature 190. For example, at the value of x corresponding to the location of the line 165, the ABS function 180C has three distinct values: Z2, Z3, and Z4.

As would be appreciated by a person having ordinary skill in the art, the feature 190 would be impossible, impractical, too expensive, or too time-consuming to create using prior-art fabrication techniques.

Figure 5A:
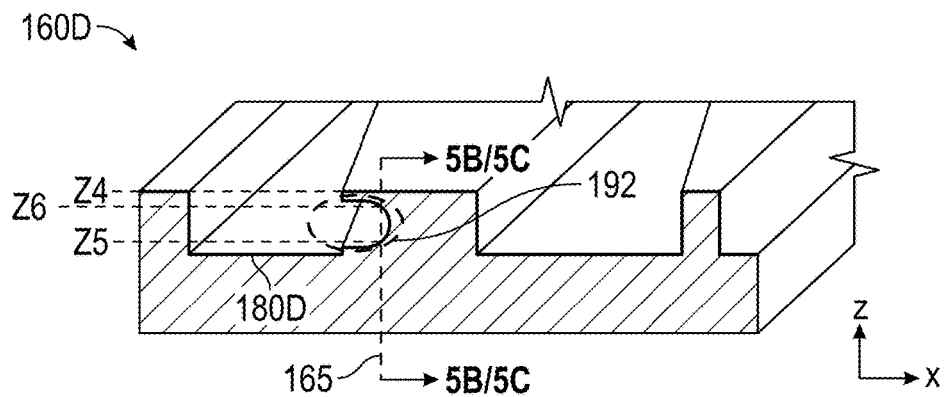
FIG. 5A illustrates a cross-section of an exemplary slider in accordance with some embodiments.

FIG. 5A illustrates an ABS function 180D of a slider cross-section 160D in accordance with some embodiments. Again, for clarity, the ABS function 180D is shown in bold. For convenience, the cross-section 160D has been taken parallel to the x-axis at a particular value along the y-axis and therefore lies in an x-z plane defined by the axes illustrated in FIGS. 2A-2C and 3A-3C. Therefore, the cross-section 160D illustrates how the ABS function 180D varies in the direction of the z-axis as a function of the value along the x-axis at a selected value of y. In embodiments in which the leading-edge surface 121 and the trailing-edge surface 122 are substantially parallel, the cross-section 160D is likewise substantially parallel to the leading-edge surface 121 and the trailing-edge surface 122. Likewise, in embodiments in which the inner-radius surface 123 and the outer-radius surface 124 are substantially parallel to each other and substantially perpendicular to the leading-edge surface 121 and the trailing-edge surface 122, the cross-section 160D is substantially perpendicular to the inner-radius surface 123 and the outer-radius surface 124.

Figure 5B:
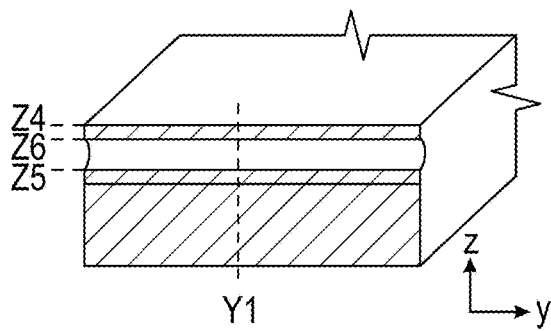
FIG. 5B illustrates a feature of a slider.
Figure 5C:
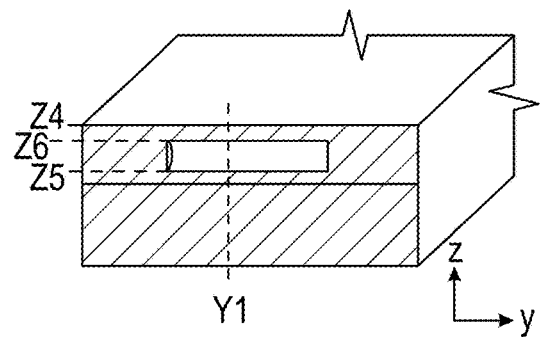
FIG. 5C illustrates a feature of a slider.

The cross-section 160D intersects a feature 192. The feature 192 may be, for example, a non-rectangular (e.g., semi-circular, cylindrical, irregularly-shaped, etc.) channel or tunnel that extends for some distance along the y-direction of the slider 525, as illustrated in FIG. 5B. FIG. 5B shows an exemplary embodiment of the feature 192 from a y-z plane assuming that the selected value of y at which the cross-section 160D of FIG. 5A was taken is Y1, shown in FIG. 5B. Alternatively, the feature 192 may be, for example, a recessed area of the slider 525 that extends for some distance along the y-direction of the slider 525. The recessed area may have any arbitrary shape that creates the feature 192 of the ABS function 180D shown in FIG. 5A. FIG. 5C illustrates an exemplary recessed area viewed in a y-z plane. FIG. 5C also shows the value Y1 at which the cross-section 160C of FIG. 5A was taken. Although FIG. 5C illustrates a slider characteristic having a fairly regular shape, the feature 192 need not be the result of a slider characteristic having a regular shape. The slider characteristic may have any shape that results in the feature 192 shown in FIG. 5A. It is to be appreciated that there are myriad slider characteristics in a y-z plane that would result in the exemplary feature 192 of FIG. 5A in an x-z plane, and the examples shown in FIGS. 5B and 5C are not intended to be limiting.

Referring again to FIG. 5A, the exemplary ABS function 180D is a multi-valued function because there is at least one value of x for which the ABS function 180D has at least two distinct nonzero values. Specifically, the ABS function 180D has at least two distinct nonzero values at the locations along the x-axis intersecting the feature 192. For example, at the value of x corresponding to the location of the line 165, the ABS function 180D has three distinct values: Z4, Z5, and Z6.

As would be appreciated by a person having ordinary skill in the art, the feature 192 would be impossible, impractical, too expensive, or too time-consuming to create using prior-art fabrication techniques.

Figure 6:
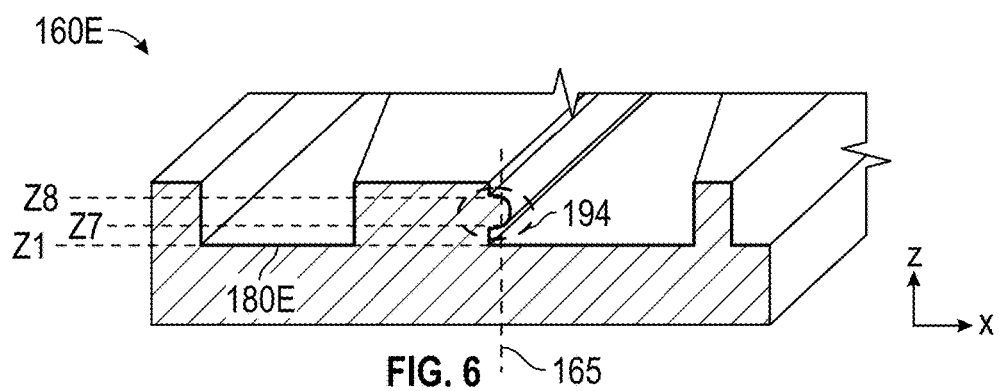
FIG. 6 illustrates a cross-section of an exemplary slider in accordance with some embodiments.

FIG. 6 illustrates an ABS function 180E of a slider cross-section 160E in accordance with some embodiments. Again, for clarity, the ABS function 180E is shown in bold. For convenience, the cross-section 160E has been taken parallel to the x-axis at a particular value along the y-axis and therefore lies in an x-z plane defined by the axes illustrated in FIGS. 2A-2C and 3A-3C. Therefore, the cross-section 160E illustrates how the ABS function 180E varies in the direction of the z-axis as a function of the value along the x-axis at a selected value of y. In embodiments in which the leading-edge surface 121 and the trailing-edge surface 122 are substantially parallel, the cross-section 160E is likewise substantially parallel to the leading-edge surface 121 and the trailing-edge surface 122. Likewise, in embodiments in which the inner-radius surface 123 and the outer-radius surface 124 are substantially parallel to each other and substantially perpendicular to the leading-edge surface 121 and the trailing-edge surface 122, the cross-section 160E is substantially perpendicular to the inner-radius surface 123 and the outer-radius surface 124.

The cross-section 160E intersects a feature 194, which is a protrusion in the x-direction of the slider 525. For example, the feature 194 may be a rail, having a uniform or a non-uniform shape, which extends for some distance in the y-direction of the slider 525, as shown in FIG. 6. Alternatively, the feature 194 may be a bump, a dome, or a protrusion having a non-uniform shape. It is to be appreciated that there are myriad slider characteristics that would result in the exemplary feature 194 of FIG. 6 in an x-z plane, and the examples provided herein are not intended to be limiting.

The exemplary ABS function 180E is a multi-valued function because there is at least one value of x for which the ABS function 180E has at least two distinct nonzero values. Specifically, the ABS function 180E has at least two distinct nonzero values at the locations along the x-axis intersecting the feature 194. For example, at the value of x corresponding to the location of the line 165, the ABS function 180E has three distinct values: Z1, Z7, and Z8.

As would be appreciated by a person having ordinary skill in the art, the feature 194 would be impossible, impractical, too expensive, or too time-consuming to create using prior-art fabrication techniques.

Figure 7:
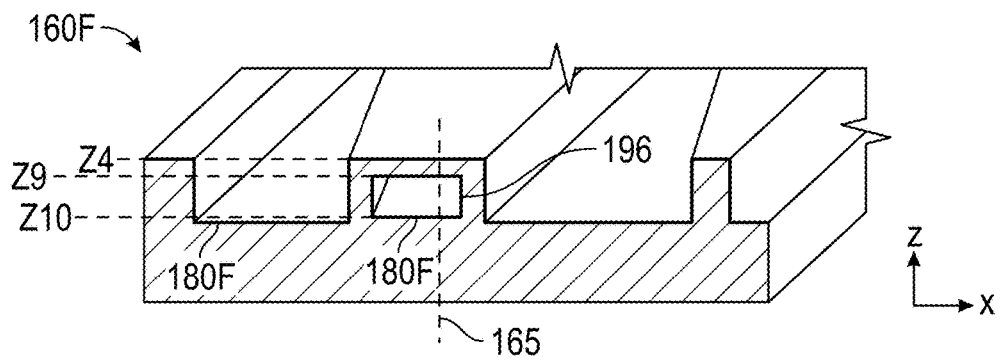
FIG. 7 illustrates a cross-section of an exemplary slider in accordance with some embodiments.

FIG. 7 illustrates an ABS function 180F of a slider cross-section 160F in accordance with some embodiments. Again, for clarity, the ABS function 180F is shown in bold. Note that the ABS function 180F is discontinuous. For convenience, the cross-section 160F has been taken parallel to the x-axis at a particular value along the y-axis and therefore lies in an x-z plane defined by the axes illustrated in FIGS. 2A-2C and 3A-3C. Therefore, the cross-section 160F illustrates how the ABS function 180F varies in the direction of the z-axis as a function of the value along the x-axis at a selected value of y. In embodiments in which the leading-edge surface 121 and the trailing-edge surface 122 are substantially parallel, the cross-section 160F is likewise substantially parallel to the leading-edge surface 121 and the trailing-edge surface 122. Likewise, in embodiments in which the inner-radius surface 123 and the outer-radius surface 124 are substantially parallel to each other and substantially perpendicular to the leading-edge surface 121 and the trailing-edge surface 122, the cross-section 160F is substantially perpendicular to the inner-radius surface 123 and the outer-radius surface 124.

The cross-section 160F intersects a feature 196, which, in the embodiment illustrated in FIG. 7, is a cavity or tunnel along the x-direction that extends into the slider 525 in the y-direction. Although FIG. 7 illustrates a rectangular cavity or tunnel, the feature 196 may have any convenient size and shape. For example, the feature 196 may have a uniform or a non-uniform shape that extends, uniformly or non-uniformly, for some distance parallel to the x- and z-axes of the slider 525 and that extends in some uniform or non-uniform way into the slider 525 in the y-direction (i.e., parallel to the y-axis). As another example, the feature 196 may have a first size and shape at a first value of y (e.g., Y1, not shown) and a second size and shape at a second value of y (e.g., Y2, not shown). In other words, the feature 196 may have an irregular shape and/or a non-uniform size that may change depending on where the cross-section 160F is taken. It is to be appreciated that there are myriad slider characteristics that would result in exemplary features (e.g., uniform or non-uniform cavities or tunnels) similar to the feature 196 of FIG. 7 in an x-z plane, and the examples provided herein are not intended to be limiting.

The feature 196 is part of the ABS 140, and therefore the ABS function 180F includes the feature 196, even though the resultant ABS function 180F is discontinuous (i.e., the portion of the ABS function 180F corresponding to the feature 196 does not intersect the rest of the ABS function 180F). The exemplary ABS function 180F is a multi-valued function because there is at least one value of x for which the ABS function 180F has at least two distinct nonzero values. For example, the ABS function 180F has at least two distinct nonzero values at the locations along the x-axis intersecting the feature 196. For example, at the value of x corresponding to the location of the line 165 shown in FIG. 7, the ABS function 180F has three distinct values: Z4, Z9, and Z10.

As would be appreciated by a person having ordinary skill in the art, the feature 196, and features having characteristics similar to the characteristics of feature 196, would be impossible, impractical, too expensive, or too time-consuming to create using prior-art fabrication techniques.

Figure 8:
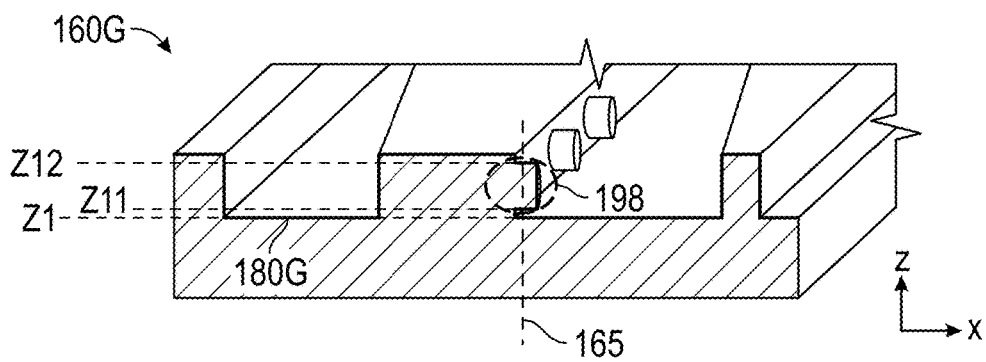
FIG. 8 illustrates a cross-section of an exemplary slider in accordance with some embodiments.

FIG. 8 illustrates an ABS function 180G of a slider cross-section 160G in accordance with some embodiments. Again, for clarity, the ABS function 180G is shown in bold. For convenience, the cross-section 160G has been taken parallel to the x-axis at a particular value along the y-axis and therefore lies in an x-z plane defined by the axes illustrated in FIGS. 2A-2C and 3A-3C. Therefore, the cross-section 160G illustrates how the ABS function 180G varies in the direction of the z-axis as a function of the value along the x-axis at a selected value of y. In embodiments in which the leading-edge surface 121 and the trailing-edge surface 122 are substantially parallel, the cross-section 160G is likewise substantially parallel to the leading-edge surface 121 and the trailing-edge surface 122. Likewise, in embodiments in which the inner-radius surface 123 and the outer-radius surface 124 are substantially parallel to each other and substantially perpendicular to the leading-edge surface 121 and the trailing-edge surface 122, the cross-section 160G is substantially perpendicular to the inner-radius surface 123 and the outer-radius surface 124.

The cross-section 160G intersects a feature 198, which, in the embodiment illustrated in FIG. 8, manifests as a protrusion in the x- and z-directions. Although FIG. 8 illustrates a cylindrical protrusion, the feature 198 may have any convenient shape. For example, the feature 198 may have a uniform or a non-uniform shape that extends for some distance parallel to the x-, y-, and z-axes of the slider 525. It is to be appreciated that there are myriad slider characteristics that would result in features similar to the feature 198 of FIG. 8 in an x-z plane, and the examples provided herein are not intended to be limiting.

The exemplary ABS function 180G is a multi-valued function because there is at least one value of x for which the ABS function 180G has at least two distinct nonzero values. For example, the ABS function 180G has at least two distinct nonzero values at the locations along the x-axis intersecting the feature 198. For example, at the value of x corresponding to the location of the line 165, the ABS function 180G has three distinct values: Z1, Z11, and Z12.

As would be appreciated by a person having ordinary skill in the art, the feature 198, and features having characteristics similar to the characteristics of feature 198, would be impossible, impractical, too expensive, or too time-consuming to create using prior-art fabrication techniques.

Figure 9:
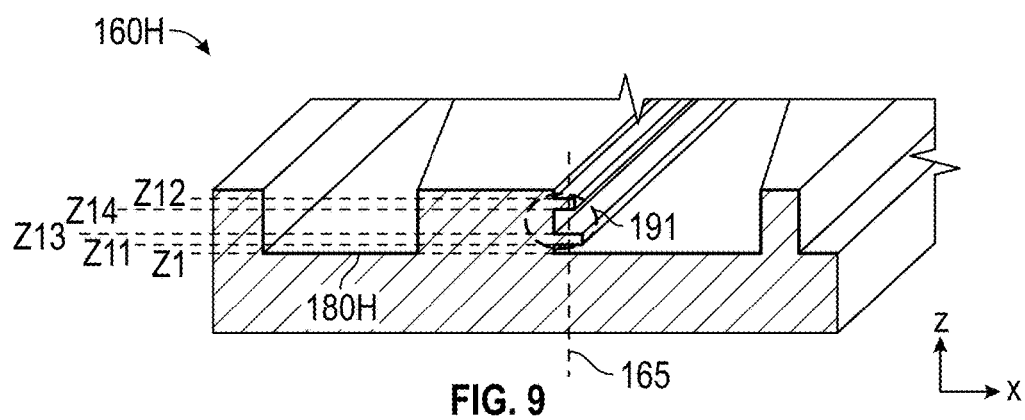
FIG. 9 illustrates a cross-section of an exemplary slider in accordance with some embodiments.

The ABS functions 180 corresponding to sliders 525 having the exemplary features 190, 192, 194, 196, and 198 are all multi-valued functions having, at most, three values of f(x) for at least one value of x. It is also possible for a slider 525 to have an ABS function having more than three values of f(x) for at least one value of x. FIG. 9 illustrates such an embodiment of an ABS function 180H having five values for at least one input value. Again, for clarity, the ABS function 180H is shown in bold. For convenience, the cross-section 160H has been taken parallel to the x-axis at a particular value along the y-axis and therefore lies in an x-z plane defined by the axes illustrated in FIGS. 2A-2C and 3A-3C. Therefore, the cross-section 160H illustrates how the ABS function 180H varies in the direction of the z-axis as a function of the value along the x-axis at a selected value of y. In embodiments in which the leading-edge surface 121 and the trailing-edge surface 122 are substantially parallel, the cross-section 160H is likewise substantially parallel to the leading-edge surface 121 and the trailing-edge surface 122. Likewise, in embodiments in which the inner-radius surface 123 and the outer-radius surface 124 are substantially parallel to each other and substantially perpendicular to the leading-edge surface 121 and the trailing-edge surface 122, the cross-section 160H is substantially perpendicular to the inner-radius surface 123 and the outer-radius surface 124.

The cross-section 160H intersects a feature 191, which, in the exemplary embodiment illustrated in FIG. 9, results from two "shelves" extending in the x- and y-directions from a vertical surface (i.e., in the z-direction) of the slider 525. It is to be appreciated that there are myriad slider characteristics that would result in the exemplary feature 191 of FIG. 9 in an x-z plane, and the examples provided herein are not intended to be limiting.

The exemplary ABS function 180H is a multi-valued function because there is at least one value of x for which the ABS function 180H has at least two distinct nonzero values. For example, the ABS function 180H has at least two distinct nonzero values at the locations along the x-axis intersecting the feature 191. For example, at the value of x corresponding to the location of the line 165, the ABS function 180H has five distinct values: Z1, Z11, Z12, Z13, and Z14.

It is to be understood that the ABS function 180 may also have more than five distinct values. The examples of features and the ABS functions 180 corresponding to those features presented herein are not intended to be limiting.

Figure 10:
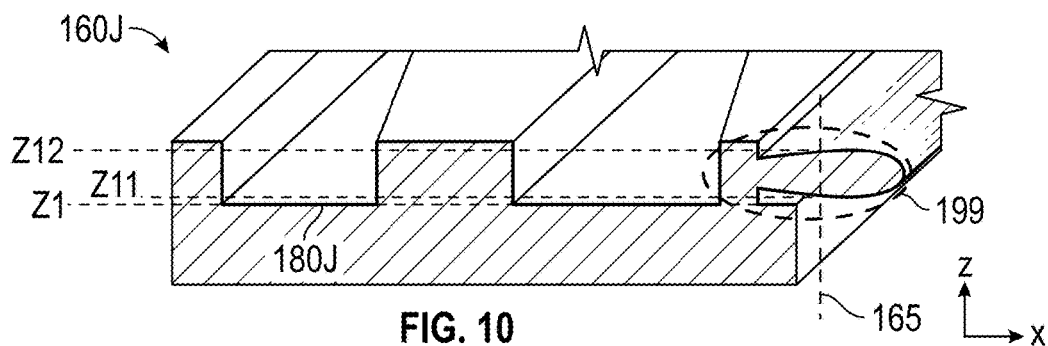
FIG. 10 illustrates a cross-section of an exemplary slider in accordance with some embodiments.

It is also to be understood that the ABS function 180 may have exactly two distinct values for certain input values along the selected axis in the x-y plane. As just one example, the slider 525 may have "wings" or "winglets" protruding from the inner-radius surface 123 and/or outer-radius surface 124. Such features could result in a slider 525 having enhanced or different aerodynamic properties than, for example, a slider 525 that has a more cuboid overall shape. FIG. 10 illustrates an ABS function 180J of a slider cross-section 160J in accordance with some embodiments. Again, for clarity, the ABS function 180J is shown in bold. For convenience, the cross-section 160J has been taken parallel to the x-axis at a particular value along the y-axis and therefore lies in an x-z plane defined by the axes illustrated in FIGS. 2A-2C and 3A-3C. Therefore, the cross-section 160J illustrates how the ABS function 180J varies in the direction of the z-axis as a function of the value along the x-axis at a selected value of y. In embodiments in which the leading-edge surface 121 and the trailing-edge surface 122 are substantially parallel, the cross-section 160J is likewise substantially parallel to the leading-edge surface 121 and the trailing-edge surface 122. Likewise, in embodiments in which the inner-radius surface 123 and the outer-radius surface 124 are substantially parallel to each other and substantially perpendicular to the leading-edge surface 121 and the trailing-edge surface 122, the cross-section 160J is substantially perpendicular to the inner-radius surface 123 and the outer-radius surface 124.

The cross-section 160J intersects a feature 199, which, in the embodiment illustrated in FIG. 10, is a wing-shaped protrusion in the x-direction from the inner-radius surface 123. It is to be understood that a similar-shaped protrusion could also extend from the outer-radius surface 124. Although FIG. 10 illustrates a wing-shaped protrusion, the feature 199 may have any convenient shape. For example, the feature 199 may have a uniform or a non-uniform shape that extends for some distance parallel to the x-axis and y-axis of the slider 525. It is to be appreciated that there are myriad slider characteristics that would result in features similar to the feature 199 of FIG. 10 in an x-z plane, and the examples provided herein are not intended to be limiting.

The exemplary ABS function 180J is a multi-valued function because there is at least one value of x for which the ABS function 180J has at least two distinct nonzero values. For example, the ABS function 180J has at least two distinct nonzero values at the locations along the x-axis intersecting the feature 199. For example, at the value of x corresponding to the location of the line 165, the ABS function 180J has exactly two distinct values: Z11 and Z12. At some other locations along the x-axis intersecting the feature 199, the ABS function 180J has exactly three distinct values, namely Z1, Z11, and Z12.

As would be appreciated by a person having ordinary skill in the art, regardless of the shapes and characteristics of the features 190, 191, 192, 194, 196, 198, and 199, these features would be impossible, impractical, too expensive, or too time-consuming to create using prior-art fabrication techniques. The features 190, 191, 192, 194, 196, 198, and 199, and myriad other features may be created, however, using the novel fabrication processes disclosed herein.

Figure 11:
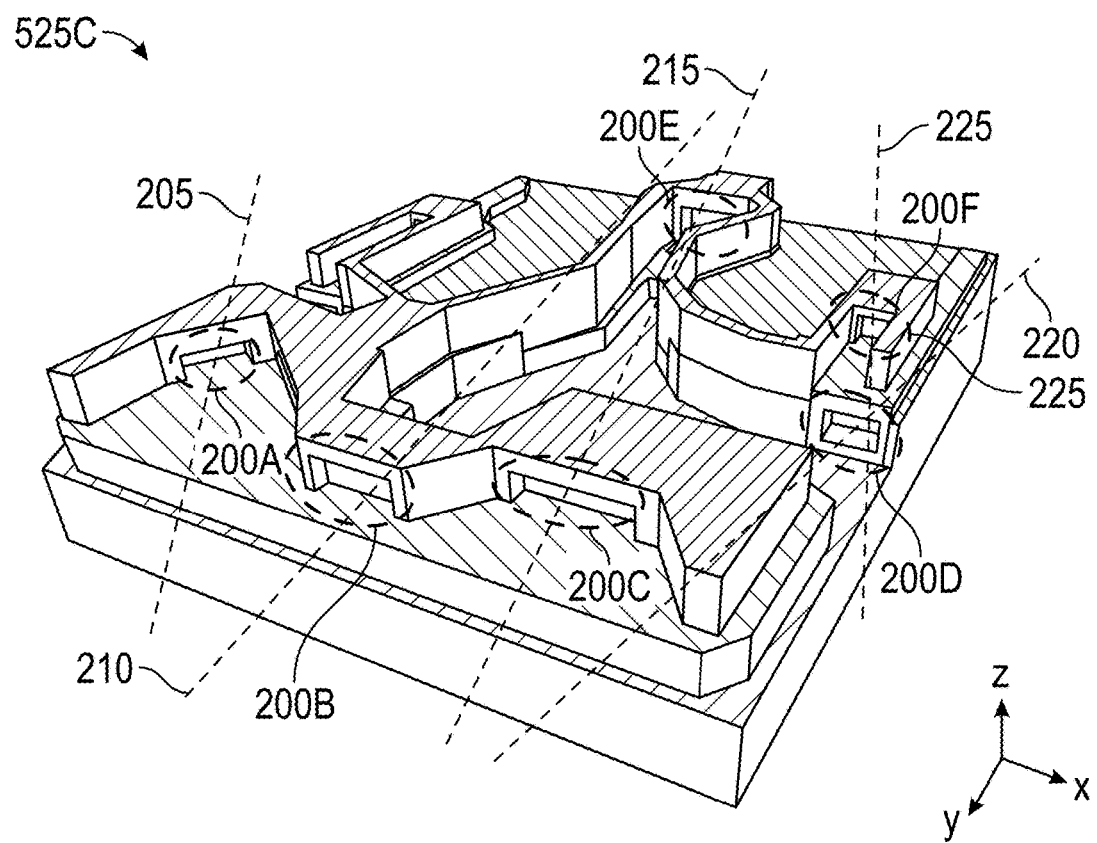
FIG. 11 illustrates an exemplary slider having features in accordance with some embodiments.

FIG. 11 illustrates an exemplary slider 525C having features 200A through 200F in accordance with some embodiments. As shown in FIG. 11, each of the features 200A through 200F is illustrated as a cavity or tunnel similar to the feature 196 shown in FIG. 7. It is to be appreciated, however, that the features 200A through 200F may have nonrectangular and/or non-uniform shapes (e.g., arbitrary shapes), and they may be protrusions or cavities, such as shown and discussed in the context of the examples provided in FIGS. 4 through 10, and as discussed below in the context of FIGS. 12 through 18. As will be understood by a person having ordinary skill in the art in view of the disclosures herein, there are myriad possible size, shapes, and characteristics of features 200A through 200F. The examples provided herein are not intended to be limiting.

One can verify by inspection that the slider 525C of FIG. 11 includes multiple cross-sections 160 that have ABS functions 180 that are multi-valued functions. For example, there are multiple cross-sections 160 of the slider 525C of FIG. 11 that, when taken perpendicular to the x-y plane defined by the substantially flat back surface 125 (not shown), will result in an ABS function 180 that is a multi-valued function. The lines 205, 210, 215, 220, and 225 identify several exemplary locations at which a cross-section 160 made perpendicular to the plane of the back surface 125 (i.e., perpendicular to the x-y plane and parallel to the z-axis shown) will result in an ABS function 180 that is a multi-valued function. The lines 205, 210, 215, 220, and 225 are shown having arbitrary orientations in the x-y plane. Therefore, the lines 205, 210, 215, 220, and 225 also have arbitrary orientations with respect to the leading-edge surface 121, trailing-edge surface 122, inner-radius surface 123, and outer-radius surface 124 (not shown in FIG. 11; refer to FIGS. 3A-3C). Of course, a cross-section 160 may be parallel or perpendicular to the leading-edge surface 121, trailing-edge surface 122, inner-radius surface 123, or outer-radius surface 124, and such cross-section 160 may also have an ABS function 180 that is a multi-valued function.

Figure 12:
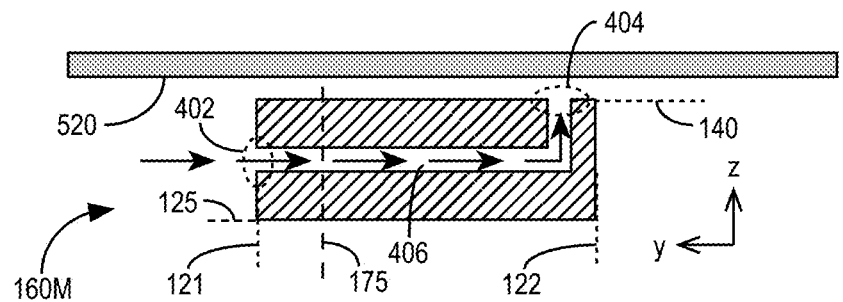
FIG. 12 illustrates a slider having a tunnel between the leading-edge surface and the ABS in accordance with some embodiments.

FIG. 12 illustrates a cross-section 160M in the y-z plane of a slider 525 in accordance with some embodiments. FIG. 12 shows the leading edge surface 121, trailing edge surface 122, back surface 125, and ABS 140 of the slider 525. As shown in FIG. 12, the cross-section 160M intersects a tunnel 406, which runs from the leading edge surface 121 through a portion of the slider 525 to the ABS 140. The tunnel 406 is part of the ABS 140. The tunnel 406 has an entry area 402 at the leading edge surface 121 and an exit area 404 at the ABS 140. Other than the entry area 402 and the exit area 404, the tunnel 406 has no other entry or exit points. As the disk 520 rotates, gas in the drive impinges on the leading edge surface 121, enters the tunnel 406 through the entry area 402, traverses the length of the tunnel 406, and leaves the slider 525 through the exit area 404. The tunnel 406 thus directs a stream of gas impinging on the leading-edge surface 121 toward the surface of the disk 520. This stream of gas pushes the slider 525 away from the surface of the disk 520, thereby encouraging the slider 525 to remain out of contact with the disk 520. Thus, including a tunnel 406 in the slider 525 provides another way to control the pitch and/or fly-height of a slider 525, and a designer may include a tunnel in a slider 525 to augment or replace traditional ABS design techniques.

One may verify by inspection that the cross-section 160M of FIG. 12 has an ABS function 180 that is a multi-valued function. For example, at the value of y corresponding to the location of the dashed line 175, the ABS function 180 has three distinct values, two of which correspond to the tunnel 406. (As explained previously, the back surface 125 is not part of the ABS 140.)

Although FIG. 12 illustrates a tunnel 406 that is substantially uniform in height at the location of the cross-section 160M, the tunnel may have virtually any characteristics, including, for example, non-uniform width, height, depth, volume, cross-sectional area, or cross-sectional circumference. For example, as shown in the exemplary cross-section 160N illustrated in FIG. 13, the tunnel 406 may have a larger entry area 402 than exit area 404 (e.g., the tunnel 406 is a convergent channel), which may, in accordance with Bernoulli's Principle, cause the speed of the gas exiting the ABS 140 at the exit area 404 to exceed the speed of the gas entering the slider 525 through the entry area 402.

Figure 13:
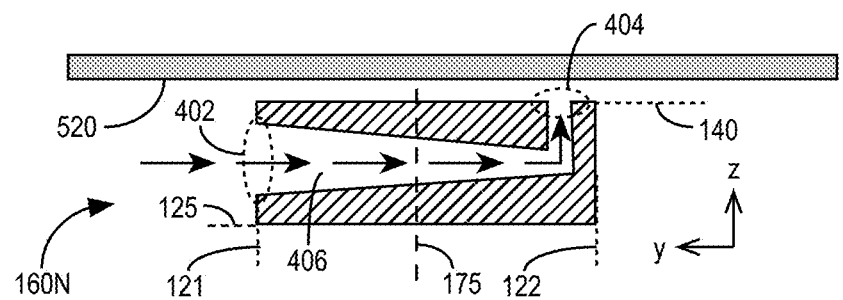
FIG. 13 illustrates another slider having a tunnel between the leading-edge surface and the ABS in accordance with some embodiments.

One may verify by inspection that the cross-section 160N of FIG. 13 has an ABS function 180 that is a multi-valued function. For example, at the value of y corresponding to the location of the dashed line 175, the ABS function 180 has three distinct values, two of which correspond to the tunnel 406. (Again, the tunnel 406 is part of the ABS 140, but the back surface 125 is not.)

Figure 14:
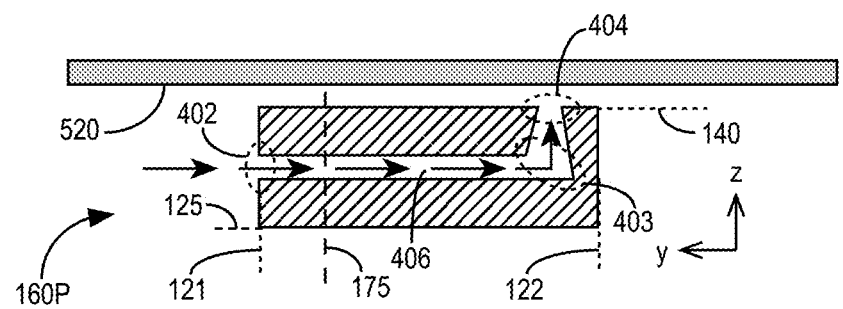
FIG. 14 illustrates another slider having a tunnel between the leading-edge surface and the ABS in accordance with some embodiments.

FIG. 13 illustrates one way that a tunnel 406 can be configured as a convergent channel to accelerate collected gas toward the surface of the disk 520. FIG. 14 illustrates another exemplary embodiment with a convergent channel configuration that also causes the collected gas to be accelerated toward the surface of the disk 520. FIG. 14 illustrates an exemplary cross-section 160P in the y-z plane of a slider 525. As shown in FIG. 14, in the cross-section 160P, the height of the tunnel 406 in the z-direction is substantially uniform near the leading edge surface 121, but at some interior position along the y-axis (which, in FIG. 14, is near the exit area 404), the circumference or perimeter of the tunnel 406 increases relative to its value near the leading edge surface 121, thereby allowing gas to collect in the broadened area 403 before being accelerated through the exit area 404 toward the surface of the disk 520.

One may verify by inspection that the cross-section 160P of FIG. 14 has an ABS function 180 that is a multi-valued function. For example, at the value of y corresponding to the location of the dashed line 175, the ABS function 180 has three distinct values, two of which correspond to the tunnel 406. (Again, the tunnel 406 is part of the ABS 140, but the back surface 125 is not.)

Figure 15A:
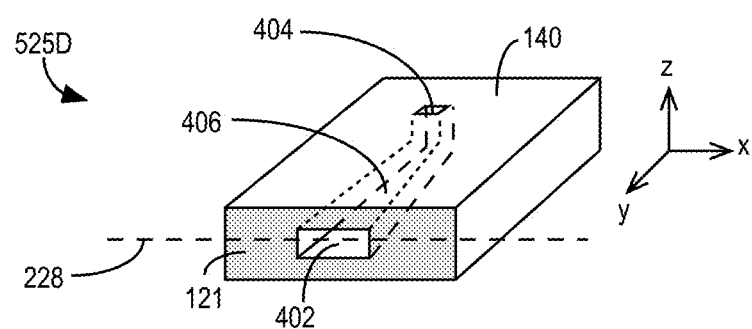
FIG. 15A illustrates a slider having a tunnel with an entry area that is larger than an exit area in accordance with some embodiments.
Figure 15B:
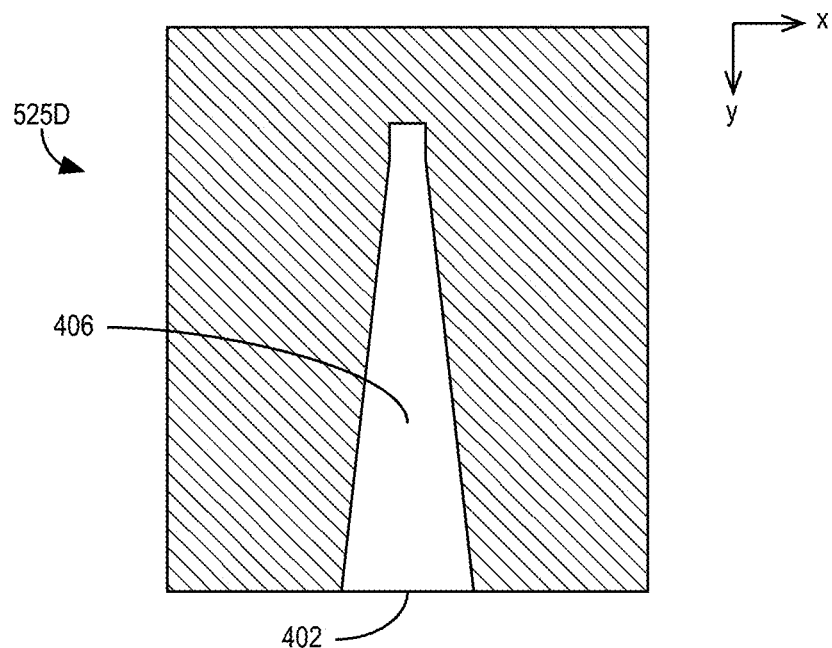
FIG. 15B illustrates a cross-section in the x-y plane of the exemplary slider of FIG. 15A.

FIG. 15A illustrates an exemplary slider 525D having a tunnel 406 between the leading edge surface 121 and the ABS 140 as described in the discussions of FIGS. 12-14. FIG. 15B illustrates a cross-section in the x-y plane of the exemplary slider 525D of FIG. 15A taken at the dashed line 228. To simplify the presentation, the only feature of the slider 525D illustrated in FIGS. 15A and 15B is the tunnel 406, which, as stated previously, is part of the ABS 140. It is to be appreciated that the slider 525D may also have other features, such as, for example, side rails, edges, stepped surfaces, or any of the other features described herein or known in the art. Similarly to the tunnel 406 illustrated in FIG. 13, the entry area 402 of the tunnel 406 in FIG. 15A is larger than the exit area 404, thus indicating that the speed of the gas exiting the slider 525D at the exit area 404 may exceed the speed of the gas entering the slider 525D at the entry area 402.

Although FIG. 15A illustrates a slider 525D in which the entry area 402 and the exit area 404 are rectangular, the entry area 402 and the exit area 404 may have any suitable shapes that result in desirable slider properties (e.g., fly height). As non-limiting examples, the entry area 402 or exit area 404 may be circular, oval, trapezoidal, triangular, or any other shape. Furthermore, the entry area 402 may have one shape, and the exit area 404 may have a different shape. Moreover, although FIGS. 15A and 15B illustrate the slider 525D having smooth and linear interior walls, it is to be appreciated that the interior walls may have any suitable shapes or forms (e.g., they may be linear or non-linear), and the surfaces of the tunnel may include one or more protrusions (e.g., rails, bumps, domes, or any other protrusions) or cavities (e.g., with uniform or non-uniform shapes) as described elsewhere herein and in the related applications incorporated by reference.

One may verify by inspection that the slider 525D shown in FIGS. 15A and 15B has multiple cross-sections 160, taken parallel to the z-axis shown in FIG. 15A, that result in ABS functions 180 that are multi-valued functions. For example, with some exceptions (e.g., a cross-section 160 taken in the x-z plane intersecting the exit area 404), many cross-sections 160 taken parallel to the z-axis that intersect the tunnel 406 will result in an ABS function 180 that is a multi-valued function. As one specific example, a cross-section 160 taken near and parallel to the leading edge surface 121 will result in an ABS function 180 that is a multi-valued function.

Figure 16A:
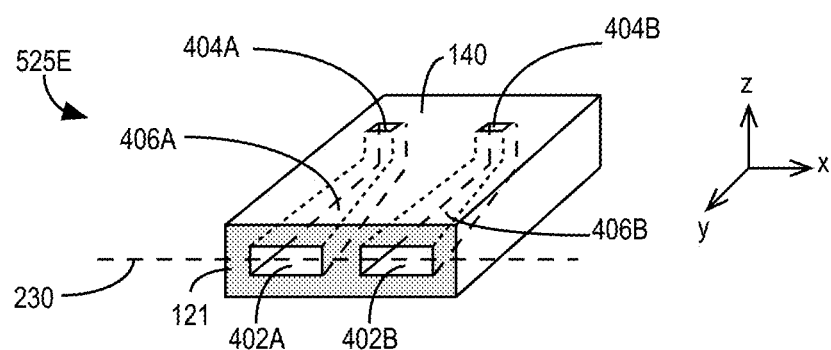
FIG. 16A illustrates a slider having two distinct tunnels, each with an entry area that is larger than an exit area, in accordance with some embodiments.
Figure 16B:
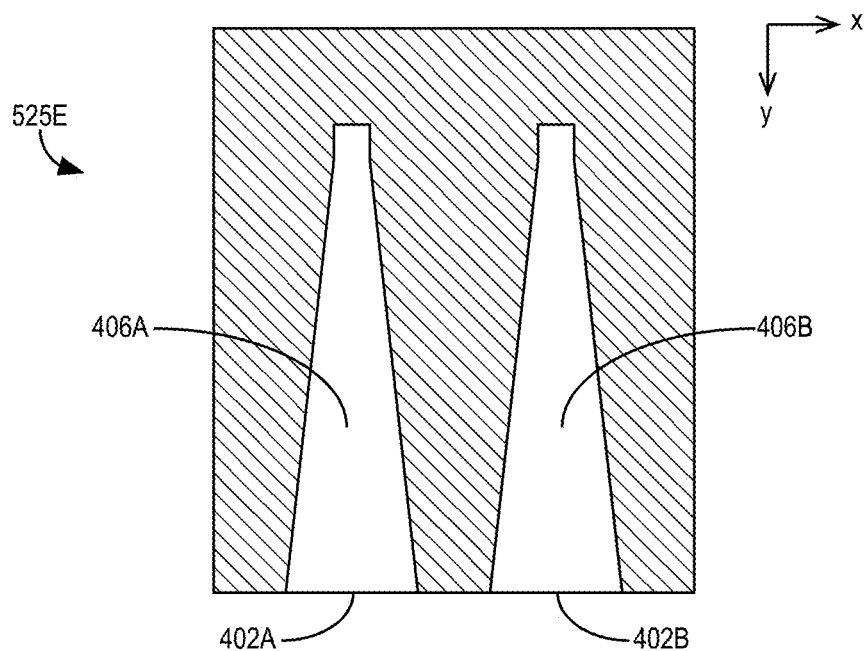
FIG. 16B illustrates a cross-section in the x-y plane of the exemplary slider of FIG. 16A.

FIG. 16A illustrates an exemplary slider 525E having two tunnels, 406A and 406B, between the leading edge surface 121 and the ABS 140. FIG. 16B illustrates a cross-section in the x-y plane of the exemplary slider 525E of FIG. 16A taken at the dashed line 230. To simplify the presentation, the only features of the slider 525E illustrated in FIGS. 16A and 16B are the tunnels 406A and 406B, which are part of the ABS 140. It is to be appreciated that the slider 525E may also have other features, such as, for example, side rails, edges, stepped surfaces, or any of the other features described herein or known in the art.

The tunnel 406A has an entry area 402A and an exit area 404A, and the tunnel 406B has an entry area 402B and an exit area 404B. As illustrated in FIG. 16A, the entry areas 402A and 402B of the tunnels 406A and 406B in FIGS. 16A and 16B are larger than the exit areas 404A and 404B, thus indicating that the speed of the gas exiting the slider 525E at the exit areas 404A and 404B may exceed the speed of the gas entering the slider 525E at the entry areas 402A and 402B.

Although FIG. 16A illustrates a slider 525E having tunnels with rectangular entry areas 402A and 402B and rectangular exit areas 404A and 404B, the entry areas 402A and 402B and the exit areas 404A and 404B may have any suitable shapes that result in desirable slider properties (e.g., fly height). As non-limiting examples, any of the entry areas 402A and 402B and exit areas 404A and 404B may be circular, oval, trapezoidal, triangular, or any other shape. Furthermore, the entry area 402A may have a first shape, the exit area 404A may have a second shape, the entry area 402B may have a third shape, and the exit area 404B may be a fourth shape, where some or all of the first, second, third, and fourth shapes may be the same or different.

Moreover, although FIGS. 16A and 16B illustrate the slider 525E having smooth and linear interior walls, it is to be appreciated that the interior walls may have any suitable shapes (e.g., they may be linear or non-linear), and the surfaces of the tunnel may include one or more protrusions (e.g., rails, bumps, domes, or any other protrusions) or cavities (e.g., with uniform or non-uniform shapes) as described elsewhere herein or in the related applications previously incorporated by reference. The tunnels 406A and 406B may have any of the features or characteristics described elsewhere herein or in the related applications previously incorporated by reference. Furthermore, although FIGS. 16A and 16B illustrate identical tunnels 406A and 406B, the two tunnels need not be identical or even substantially similar.

Additionally, a slider may include more than two distinct, separate tunnels 406, and these tunnels 406 may be similar, identical, or different from each other in entry area 402 size and shape, exit area 404 size and shape, tunnel wall smoothness or features, or any other characteristic.

One may verify by inspection that the slider 525E shown in FIGS. 16A and 16B has multiple cross-sections 160, taken parallel to the z-axis shown in FIG. 16A, that result in ABS functions 180 that are multi-valued functions. For example, with some exceptions (e.g., a cross-section 160 taken in the x-z plane intersecting the exit areas 404A and 404B), many cross-sections 160 taken parallel to the z-axis that intersect one or both of the tunnels 406A and 406B will result in an ABS function 180 that is a multi-valued function. As one specific example, a cross-section 160 taken near and parallel to the leading edge surface 121 will result in an ABS function 180 that is a multi-valued function.

Figure 17A:
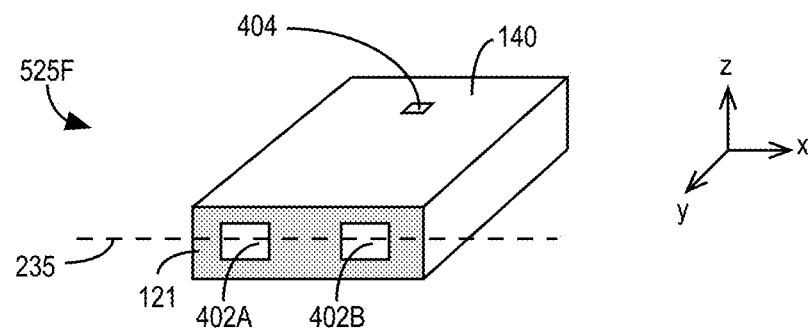
FIG. 17A illustrates a slider having two entry areas and one exit area in accordance with some embodiments.

FIG. 17A illustrates an exemplary slider 525F having a tunnel 406 between the leading edge surface 121 and the ABS 140. In the exemplary embodiment of FIG. 17A, the tunnel 406 has two entry areas, 402A and 402B, and a single exit area 404. The entry areas 402A and 402B of the tunnel 406 in FIG. 17A are larger than the exit area 404, thus indicating that the speed of the gas exiting the slider 525F at the exit area 404 may exceed the speed of the gas entering the slider 525F at the entry areas 402A and 402B.

Although FIG. 17A illustrates a slider 525F in which the entry areas 402A and 402B and the exit area 404 are rectangular, the entry areas 402A and 402B and the exit area 404 may have any suitable shapes that result in desirable slider properties (e.g., fly height). As non-limiting examples, the entry areas 402A, 402B and exit area 404 may be circular, oval, trapezoidal, triangular, or any other shape. Furthermore, the entry area 402A may have a first shape, the entry area 402B may have a second shape, and the exit area 404 may have a third shape, where one or more of the first, second, and third shapes are identical, substantially similar, or different.

Figure 17B:
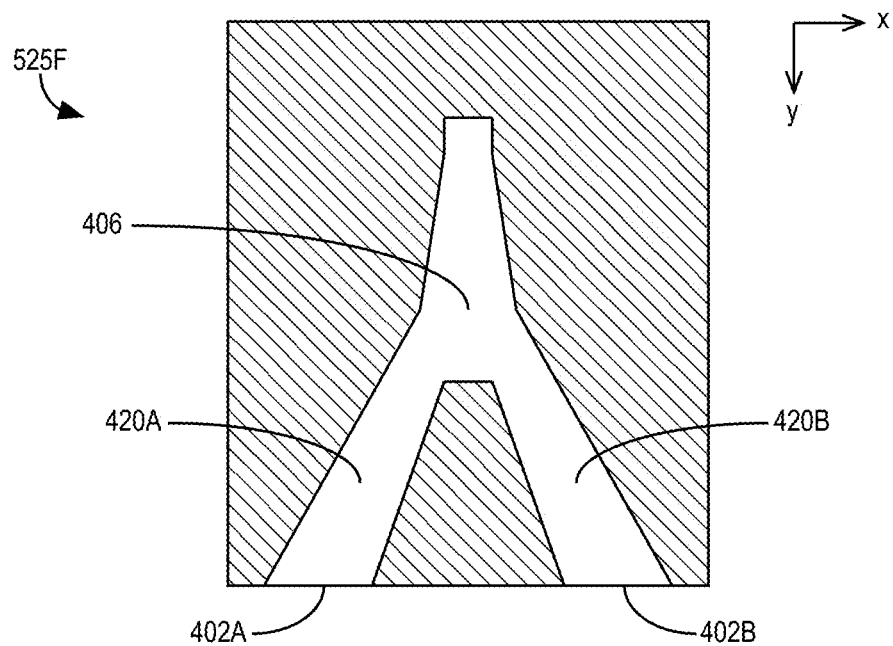
FIG. 17B illustrates a cross-section in the x-y plane of the exemplary slider of FIG. 17A.

FIG. 17B illustrates a cross-section in the x-y plane of the exemplary slider 525F of FIG. 17A taken at the dashed line 235. The tunnel 406 has two branches, 420A and 420B. The branch 420A connects the entry area 402A to the body of the tunnel 406 and to the exit area 404, and the branch 420B connects the entry area 402B to the body of the tunnel 406 and to the exit area 404. Although FIG. 17B illustrates branches 420A and 420B that are mirror images of each other, the branches 420A and 420B may differ in size, shape, and/or features (e.g., protrusions, cavities, textures, etc.). For example, one of the branches 420 may be wider or taller than the other, or it may have a different shape entirely (e.g., one of the branches 420 may have a linear surface, and the other branch 420 may have a non-linear surface). As another example, one of the entry areas 402 may be offset in the z-direction from the other entry area 402, such that the branches 420 may differ.

To simplify the presentation, the only feature of the slider 525F illustrated in FIGS. 17A and 17B is the tunnel 406, which is part of the ABS 140. It is to be appreciated that the slider 525F may also have other features, such as, for example, side rails, edges, stepped surfaces, or any of the other features described herein or known in the art.

Although FIG. 17B illustrates the slider 525F having smooth and linear interior walls, it is to be appreciated that the interior walls may have any suitable shapes (e.g., they may be linear or non-linear), and the surfaces of the tunnel may include one or more protrusions (e.g., rails, bumps, domes, or any other protrusions) or cavities (e.g., with uniform or non-uniform shapes) as described elsewhere herein or in the related applications previously incorporated by reference. Furthermore, the tunnel 406 may have more than two entry areas 402 and/or more than one exit area 404, in which case the tunnel 406 will also have more than two branches 420.

One may verify by inspection that the slider 525F shown in FIGS. 17A and 17B has multiple cross-sections 160, taken parallel to the z-axis shown in FIG. 17A, that result in ABS functions 180 that are multi-valued functions. For example, with some exceptions (e.g., a cross-section 160 taken in the x-z plane intersecting the exit area 404), many cross-sections 160 taken parallel to the z-axis that intersect the tunnel 406 will result in an ABS function 180 that is a multi-valued function. As one specific example, a cross-section 160 taken near and parallel to the leading edge surface 121 will result in an ABS function 180 that is a multi-valued function.

Figure 18A:
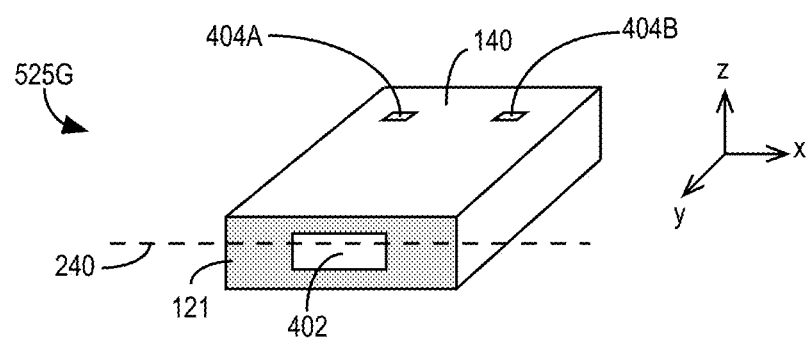
FIG. 18A illustrates a slider having one entry area and two exit areas in accordance with some embodiments.

FIG. 18A illustrates an exemplary slider 525G having a tunnel 406 between the leading edge surface 121 and the ABS 140. In the exemplary embodiment of FIG. 18A, the tunnel 406 has one entry area 402 and two exit areas 404A and 404B. The entry area 402 of the tunnel 406 in FIG. 18A is larger than either of the exit areas 404A and 404B, thus indicating that the speed of the gas exiting the slider 525G at the exit areas 404A and 404B may exceed the speed of the gas entering the slider 525G at the entry area 402.

Although FIG. 18A illustrates a slider 525G in which the entry area 402 and the exit areas 404A and 404B are rectangular, the entry area 402 and the exit areas 404A and 404B may have any suitable shapes that result in desirable slider properties (e.g., fly height). As non-limiting examples, the entry area 402 and exit areas 404A and 404B may be circular, oval, trapezoidal, triangular, or any other shape. Furthermore, the entry area 402 may have a first shape, the exit area 404A may have a second shape, and the exit area 404B may have a third shape, where one or more of the first, second, and third shapes are identical, substantially similar, or different.

Figure 18B:
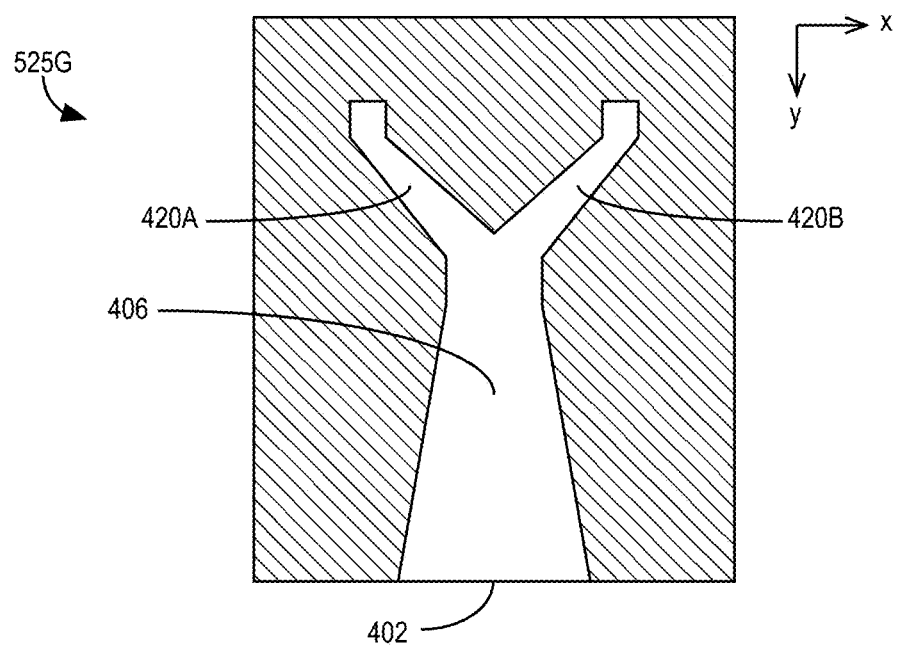
FIG. 18B illustrates a cross-section in the x-y plane of the exemplary slider of FIG. 18A.

FIG. 18B illustrates a cross-section in the x-y plane of the exemplary slider 525G of FIG. 18A taken at the dashed line 240. The tunnel 406 has two branches, 420A and 420B. The branch 420A connects the body of the tunnel 406 to the exit area 404A, and the branch 420B connects the body of the tunnel 406 to the exit area 404B. Although FIG. 18B illustrates branches 420A and 420B that are mirror images of each other, the branches 420A and 420B may differ in size, shape, and/or features (e.g., protrusions, cavities, textures, etc.). For example, one of the branches 420 may be wider or taller than the other, or it may have a different shape entirely (e.g., one of the branches 420 may have a linear surface, and the other branch 420 may have a non-linear surface). As another example, one of the exit areas 404 may be offset in the x-y plane from the other exit area 404, such that the branches 420A and 420B may differ.

To simplify the presentation, the only feature of the slider 525G illustrated in FIGS. 18A and 18B is the tunnel 406, which is part of the ABS 140. It is to be appreciated that the slider 525G may also have other features, such as, for example, side rails, edges, stepped surfaces, or any of the other features described herein or known in the art.

Although FIG. 18B illustrates the slider 525G having smooth and linear interior walls, it is to be appreciated that the interior walls may have any suitable shapes (e.g., they may be linear or non-linear), and the surfaces of the tunnel may include one or more protrusions (e.g., rails, bumps, domes, or any other protrusions) or cavities (e.g., with uniform or non-uniform shapes) as described elsewhere herein or in the related applications previously incorporated by reference. Furthermore, the tunnel 406 may have more than one entry area 402 and/or more than two exit areas 404, in which case the tunnel 406 will also have more than two branches 420.

One may verify by inspection that the slider 525G shown in FIGS. 18A and 18B has multiple cross-sections 160, taken parallel to the z-axis shown in FIG. 18A, that result in ABS functions 180 that are multi-valued functions. For example, with some exceptions (e.g., a cross-section 160 taken in the x-z plane intersecting the exit areas 404A and 404B), many cross-sections 160 taken parallel to the z-axis that intersect the tunnel 406 will result in an ABS function 180 that is a multi-valued function.

As stated elsewhere, although FIGS. 12 through 18 illustrate exemplary tunnels 406 that have smooth surfaces, it is to be understood that the surfaces of a tunnel 406 need not be smooth. For example, the walls or surfaces of a tunnel 406 may include any of the features described previously (i.e., 190, 191, 192, 193, 194, 195, 196, 198, 199, 200), or any other feature that may be created using the fabrication techniques disclosed in the related applications incorporated by reference. Such features include, but are not limited to, protrusions and cavities.

Furthermore, although FIGS. 12 through 18 illustrate tunnels 406 that have one or more exit areas 404 at the ABS 140, the tunnels 406 may have, alternatively or in addition, one or more exit areas 404 at other surfaces of the slider 525. For example, the tunnel 406 may have an exit area 404 at the trailing edge surface 122, the inner-radius surface 123, or the outer-radius surface 124 in addition to, or instead of, an exit area 404 at the ABS 140. In general, the tunnel 406 may have exit areas 404 at any combination of multiple surfaces selected from the group consisting of the ABS 140, the trailing edge surface 122, the inner-radius surface 123, and the outer-radius surface 124.

Likewise, although FIGS. 12 through 18 illustrate tunnels 406 that have one or more entry areas 402 at the leading edge surface 121, the tunnels 406 may have, alternatively or in addition, one or more entry areas 402 at other surfaces of the slider 525. For example, the tunnel 406 may have an entry area 402 at the inner-radius surface 123 or the outer-radius surface 124 in addition to, or instead of, an entry area 402 at the leading edge surface 121. In general, the tunnel 406 may have entry areas 402 at any combination of multiple surfaces selected from the group consisting of the leading edge surface 121, the inner-radius surface 123, and the outer-radius surface 124.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used herein, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The drawings are not necessarily to scale, and the dimensions, shapes, and sizes of the features may differ substantially from how they are depicted in the drawings. Furthermore, the use, labeling, and orientation of the x-, y-, and z-axes are for convenience and to facilitate the explanations provided herein.

Moreover, although the exemplary wafers 120 and sliders 525 have cuboid shapes, other wafer 120 and slider 525 shapes may be used without departing from the spirit and scope of this disclosure.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A slider, comprising:
   a leading-edge surface;
   an air-bearing surface (ABS); and
   a tunnel having an entry area at the leading-edge surface and an exit area at the ABS, the tunnel for directing gas impinging on the entry area through the slider and out the exit area toward a surface of a hard disk.

2. The slider recited in claim 1, wherein the entry area is larger than the exit area.

3. The slider recited in claim 1, wherein at least one surface of the tunnel is smooth.

4. The slider recited in claim 1, wherein the tunnel is a convergent tunnel.

5. The slider recited in claim 1, wherein a perimeter of the tunnel at an interior position within the tunnel is larger than a perimeter of the exit area.

6. The slider recited in claim 1, wherein at least one surface of the tunnel includes a protrusion.

7. The slider recited in claim 6, wherein the protrusion comprises a rail, a bump, or a dome.

8. The slider recited in claim 1, wherein at least one surface of the tunnel includes a cavity.

9. The slider recited in claim 8, wherein the cavity has a uniform shape.

10. The slider recited in claim 1, wherein the tunnel is a first tunnel, the entry area is a first entry area, and the exit area is a first exit area, and further comprising a second tunnel having a second entry area at the leading-edge surface and a second exit area at the ABS, the second tunnel for directing gas impinging on the second entry area through the slider and out the second exit area toward the surface of the hard disk.

11. The slider recited in claim 1, wherein the entry area is a first entry area, and further comprising a second entry area, and wherein the tunnel includes a first branch connecting the first entry area to the exit area and a second branch connecting the second entry area to the exit area.

12. The slider recited in claim 1, wherein the exit area is a first exit area, and further comprising a second exit area, and wherein the tunnel includes a first branch connecting the entry area to the first exit area and a second branch connecting the entry area to the second exit area.

13. The slider recited in claim 1, further comprising a back surface opposite the ABS, at least a portion of the back surface defining a plane, wherein an ABS function of a cross-section of the slider taken perpendicular to the plane is a multi-valued function.

14. The slider recited in claim 13, wherein at least a portion of the leading-edge surface is substantially perpendicular to the plane, and wherein the cross-section is substantially perpendicular or substantially parallel to the at least a portion of the leading-edge surface.

15. The slider recited in claim 13, wherein the cross-section is oriented along an axis in the plane, and wherein the multi-valued function has at least three distinct values for at least one input value along the axis.

16. The slider recited in claim 15, wherein the cross-section intersects the tunnel.

17. The slider recited in claim 13, wherein the cross-section is oriented along an axis in the plane, and wherein the multi-valued function has exactly three distinct values for at least one input value along the axis.

18. The slider recited in claim 17, wherein the cross-section intersects the tunnel.

19. A hard disk drive comprising the slider recited in claim 13.

20. A hard disk drive comprising the slider recited in claim 1.

* * * * *